(12) United States Patent
Spiegel et al.

(10) Patent No.: US 10,647,804 B2
(45) Date of Patent: May 12, 2020

(54) METHODS FOR MAKING WATER BASED CATIONIC POLYMERS FOR INK, COATING, AND FILM APPLICATIONS

(71) Applicant: PENN COLOR, INC., Doylestown, PA (US)

(72) Inventors: Michael D. Spiegel, Elmwood Park, NJ (US); Charles B. Rybny, Doylestown, PA (US)

(73) Assignee: PENN COLOR, INC., Doylestown, PA (US)

( * ) Notice: Subject to any disclaimer, the term of this patent is extended or adjusted under 35 U.S.C. 154(b) by 429 days.

(21) Appl. No.: 15/229,357

(22) Filed: Aug. 5, 2016

(65) Prior Publication Data

US 2016/0340459 A1   Nov. 24, 2016

Related U.S. Application Data

(62) Division of application No. 13/586,123, filed on Aug. 15, 2012, now Pat. No. 9,441,123.

(51) Int. Cl.

| C08F 261/04 | (2006.01) |
| C09D 11/107 | (2014.01) |
| C09D 11/30 | (2014.01) |
| C09D 151/00 | (2006.01) |
| C09D 11/10 | (2014.01) |
| C08F 259/04 | (2006.01) |
| C08F 263/04 | (2006.01) |
| C09D 11/106 | (2014.01) |

(52) U.S. Cl.
CPC .......... *C08F 261/04* (2013.01); *C08F 259/04* (2013.01); *C08F 263/04* (2013.01); *C09D 11/10* (2013.01); *C09D 11/106* (2013.01); *C09D 11/107* (2013.01); *C09D 11/30* (2013.01); *C09D 151/003* (2013.01)

(58) Field of Classification Search
None
See application file for complete search history.

(56) References Cited

U.S. PATENT DOCUMENTS

| 4,597,794 A | 7/1986 | Ohta et al. |
| 5,085,698 A | 2/1992 | Ma et al. |
| 5,233,003 A | 8/1993 | Lucas et al. |
| 5,478,602 A | 12/1995 | Shay et al. |
| 5,556,924 A | 9/1996 | Fitzgerald et al. |
| 5,693,716 A | 12/1997 | Bott et al. |
| 6,087,416 A | 7/2000 | Pearlstine et al. |
| 6,103,781 A | 8/2000 | Li et al. |
| 6,117,921 A | 9/2000 | Ma et al. |
| 6,165,455 A | 12/2000 | Torgerson et al. |
| 6,306,939 B1 | 10/2001 | Gupta et al. |
| 6,348,256 B1 | 2/2002 | Rabasco et al. |
| 6,365,652 B2 | 4/2002 | Gupta et al. |
| 6,406,143 B1 | 6/2002 | Chen et al. |
| 6,497,868 B1 | 12/2002 | Tanahashi |
| 6,824,881 B2 | 11/2004 | Lautenschlager et al. |
| 6,905,807 B2 | 6/2005 | Morrison et al. |
| 7,005,225 B2 | 2/2006 | Qian et al. |
| 7,008,745 B2 | 3/2006 | Qian et al. |
| 7,014,973 B2 | 3/2006 | Qian et al. |
| 7,052,816 B2 | 5/2006 | Qian et al. |
| 7,060,408 B2 | 6/2006 | Qian et al. |
| 7,074,537 B2 | 7/2006 | Qian et al. |
| 7,105,263 B2 | 9/2006 | Moudry et al. |
| 7,135,264 B2 | 11/2006 | Qian et al. |
| 7,166,405 B2 | 1/2007 | Qian et al. |
| 7,183,030 B2 | 2/2007 | Moudry et al. |
| 7,195,852 B2 | 3/2007 | Moudry et al. |
| 7,244,540 B2 | 7/2007 | Zhu et al. |
| 7,306,886 B2 | 12/2007 | Herman et al. |
| 7,320,853 B2 | 1/2008 | Chou et al. |
| 7,326,754 B2 | 2/2008 | Nikolic et al. |
| 7,371,498 B2 | 5/2008 | Moudry et al. |

(Continued)

FOREIGN PATENT DOCUMENTS

| EP | 0149038 | 7/1985 |
| EP | 0952168 A1 | 10/1999 |

(Continued)

OTHER PUBLICATIONS

Ekman et al., "Preparation of Ethylene Copolymers Containing Pendant Unsaturation for Radiation Crosslinking" Journal of Applied Polymer Science, vol. 48, pp. 167-179, (1993).

International Search Report and Written Opinion dated Nov. 8, 2013 by the Korean Intellectual Property Office (in its capacity as International Searching Authority) for corresponding International Patent Application No. PCT/US2013/054935.

Le, Hue P., "Progress and Trends in Ink-jet Printing Technology" Journal of Imaging Science and Technology, vol. 42, No. 1, pp. 49-62, (Jan. / Feb. 1998).

Mohammed et al., "Emulsion Terpolymerization of Dimethyl Meta-Isopropenyl Benzyl Isocyanate (TMI®) with Acrylic Monomers: Process Development and Kinetics" Journal of Applied Polymer Science, vol. 61, pp. 911-921, (1996).

(Continued)

Primary Examiner — Irina S Zemel
Assistant Examiner — Jeffrey S Lenihan
(74) Attorney, Agent, or Firm — Stradley Ronon Stevens & Young, LLP

(57) ABSTRACT

The present invention provides a process for producing a durable, external surfactant free, cationic, water based jet ink polymer which when formulated into an ink, coating or film that results in a excellent adhesion to metal or plastic substrates. The hybridized copolymer comprises a hydrophobic functional polymeric backbone comprising a functional vinylchloride-containing polymer portion having an average molecular weight of from 15,000 to 200,000 g/mole and at least one polymer portion selected from the group consisting of a functional polyolefin and a functional polysiloxane. The hybridized copolymer also comprises a plurality of copolymeric side chains attached to the backbone, comprising a polymerizable amine-containing unsaturated monomer, and a polymerizable unsaturated monomer.

43 Claims, No Drawings

(56) References Cited

U.S. PATENT DOCUMENTS

| | | |
|---|---|---|
| 7,405,027 B2 | 7/2008 | Chou et al. |
| 7,964,665 B2 | 6/2011 | Nagao et al. |
| 7,972,666 B2 | 7/2011 | Johnson et al. |
| 8,906,997 B2 | 12/2014 | Burghart |
| 2005/0053734 A1 | 3/2005 | Nutter et al. |
| 2005/0215664 A1 | 9/2005 | Elwakil et al. |
| 2005/0250028 A1 | 11/2005 | Qian et al. |
| 2005/0282932 A1 | 12/2005 | Takizawa et al. |
| 2006/0093953 A1 | 5/2006 | Simpson et al. |
| 2009/0023854 A1 | 1/2009 | Takizawa et al. |

FOREIGN PATENT DOCUMENTS

| | | |
|---|---|---|
| EP | 1683842 A1 | 7/2006 |
| JP | S62-39609 | 2/1987 |
| JP | 2006-036830 | 2/2006 |
| WO | 90/13609 | 11/1990 |
| WO | 2006/101543 | 9/2006 |
| WO | 2009/062996 | 5/2009 |

OTHER PUBLICATIONS

Supplementary Extended European Search Report dated Feb. 1, 2016 for corresponding/counterpart European Patent Application No. 13829697.5.

Szabo, Barna "Applications for Printing Inks" Chapter 5, in Polymer Dispersions and Their Industrial Applications, pp. 103-122 Edited by Dieter Urban and Koichi Takamura, Copyright © 2002 Wiley-VCH Verlag GmbH & Co. KGaA.

Treviño et al., "Shelf Stability of Isocyanate-Functionalized Vinyl Acrylic Latexes" Macromol. Symp., v 283-284, pp. 300-306, (2009) Wiley-VCH Verlag GmbH & Co. KGaA, Weinham.

Yoon et al., "Novel Photopolymers Composed of Thermoplastic and Photoreactive Binders for Holographic Application" Journal of Nonlinear Optical Physics and Materials, vol. 13, Nos. 3 & 4, pp. 569-574, (2004) World Scientific Publishing Company.

METHODS FOR MAKING WATER BASED CATIONIC POLYMERS FOR INK, COATING, AND FILM APPLICATIONS

CROSS-REFERENCE TO RELATED PATENT APPLICATIONS

This application is a divisional application of U.S. Ser. No. 13/586,123, filed Aug. 15, 2012, which is incorporated herein by reference in its entirety.

FIELD OF INVENTION

The present invention relates to a cationic polymer suitable for water based ink, coating, and film applications.

BACKGROUND OF THE INVENTION

The ink-jet technology is a contact free dot matrix printing procedure. Ink is issued from a small aperture directly onto a specific position on a medium. Hue P. Le, Journal of Imaging Science and Technology, Volume 42, Number 1, January/February 1998. Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. Thermal inkjet printers use resistors to create heat, which in turn vaporizes ink to form a bubble; as the bubble expands, some of the ink is pushed out of the nozzle. A vacuum is created when the bubble collapses, which pulls more ink from the cartridge into the print head. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to short run printing of grand format, billboard advertisements and lightfast industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment particle to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the pigment will tend to smear upon exposure to moisture.

In the ionic technique, the pigment particles are stabilized by a polymer of an ion containing monomer, such as neutralized acrylic, maleic, or vinyl sulfonic acid. The polymer provides stabilization through a charged double layer mechanism whereby ionic repulsion hinders the particles from flocculating. Since the neutralizing component tends to evaporate after application, the polymer then has reduced water solubility and the final product is not water sensitive.

U.S. Pat. No. 5,085,698 discloses a pigmented ink for ink jet printers which comprises an aqueous carrier medium, and pigment particles dispersed in an AB or BAB block copolymer having a hydrophilic segment and a segment that links to the pigment. The A block is a hydrophobic polymer of an acrylic monomer, whereas the B block(s) is a hydrophobic polymer of an acrylic monomer.

Graft copolymeric stabilizers comprising various acrylate derivatives is disclosed in U.S. Pat. No. 6,103,781. The incorporation of organosols having crystallizable polymeric moieties into the ink compositions provided improved blocking resistance and improved erasure resistance when used in ink transfer, ionographic, electrographic and electrophotographic color printing or proofing processes.

SUMMARY OF THE INVENTION

In one aspect, provided is a process for preparing a hybridized copolymer comprising the steps of (a) reacting a functionalized hydrophobic polymer of an average molecular weight from about 15,000 to about 200,000 g/mole, with a hybridizing compound to create a reaction mixture; (b) adding a first monomer component to the reaction mixture; (c) adding a second monomer component to the reaction mixture; and (d) neutralizing the reaction mixture with an acid, wherein the hydrophobic polymer is selected from the group consisting of a polysiloxane polymer, a polyolefin polymer, a polyvinyl polymer, and a copolymer thereof, wherein the first monomer component, or the second monomer component, or both monomer components comprise a polymerizable unsaturated monomer; and wherein the first monomer component, or the second monomer component, or both monomer components comprise a polymerizable amine-containing unsaturated monomer.

In another aspect, the development provides a process for preparing a hybridized copolymer comprising the steps of (a) reacting a functionalized hydrophobic polymer of an average molecular weight of from about 15,000 to about 200,000 g/mole, with a hybridizing compound to create a reaction mixture; (b) adding a monomer component to the reaction mixture; and (c) neutralizing the reaction mixture with an acid, wherein the hydrophobic polymer is selected from the group consisting of a polysiloxane polymer, a polyolefin polymer, and a polyvinyl polymer or a copolymer thereof, and wherein the monomer component comprises a polymerizable unsaturated monomer and a polymerizable amine-containing unsaturated monomer.

In another aspect, the development provides a process for preparing a hybridized copolymer comprising the steps of (a) mixing a functionalized hydrophobic polymer of an average molecular weight from about 15,000 to about 200,000 g/mole, a hybridizing compound, a polymerizable unsaturated monomer, and a polymerizable amine-containing unsaturated monomer to create a reaction mixture; (b) increasing the temperature of the reaction mixture to cause a polymerization reaction to occur within the reaction mixture; and (c) neutralizing the reaction mixture with an acid, wherein the hydrophobic polymer is selected from the group consisting of a polysiloxane polymer, a polyolefin polymer, and a polyvinyl polymer, or a copolymer thereof.

DETAILED DESCRIPTION OF THE INVENTION

One of the purposes of this invention is to provide a durable, external surfactant free, cationic, water based jet ink polymer which when formulated into an ink jet ink provides printing that has an excellent adhesion to metal or plastic substrates. Such jet ink polymer is a suitable performance replacement for solvent soluble polymers currently in commercial use. The use of the inks of the present invention enhances performance criteria such as print-head open time, ink stability under varying conditions, and resistance to typical water based cleaners.

Known conventional water based latex polymers contain small suspended insoluble organic polymers within a micellular structure the size of which can vary with changes in temperature or the addition of water miscible solvents or organic amines. The solubility characteristics of the new polymer eliminates such problems.

The practice of the present invention employs, unless otherwise indicated, conventional techniques of polymer chemistry, organic chemistry, and related fields, which are within the skill of art. See, for example, Paul C. Hiemenz, POLYMER CHEMISTRY: THE BASIC CONCEPTS, Marcel Dekker (1984); Sandler, Karo, Bonesteel and Pearce, POLYMER SYNTHESIS AND CHARACTERIZATION, Academic Press (1998).

As used in the specification and claims, the singular form "a", "an" and "the" include plural references unless the context clearly dictates otherwise. For example, the term "a monomer" includes a plurality of monomers, including mixtures of monomers.

As used herein, the term "comprising" is intended to mean that the defined compositions and methods include the recited elements, but not exclude others. "Consisting essentially of" when used to define compositions and methods, shall mean to exclude other elements of any essential significance to the combination. Thus, a composition consisting essentially of the elements as defined herein would not exclude trace contaminants from the isolation and purification methods. "Consisting of" shall mean to exclude more than trace elements of other ingredients. Embodiments defined by each of these transition terms are within the scope of this invention.

All numerical designations, such as, weight, pH, temperature, time, concentration, and molecular weight, including ranges, are approximations which are varied by 10%. It is to be understood, although not always explicitly stated, that all numerical designations are preceded by the term "about." It also is to be understood, although not always explicitly stated, that the reagents described herein are merely exemplary and that equivalents of such are known in the art.

The term "functional" when referring to a polymeric portion of a molecule means that the polymer portion of the molecule has covalent bonds to other portions of the molecule.

The phrase "functionalized polymer" refers to a polymer that contains functional groups. Such functional groups are typically reactive towards other reactants, which may be useful in synthesis of further polymers. Examples of such functional groups includes hydroxide.

The phrase "hydrophobic polymer" refers to apolar polymers which contain a relatively small proportion of oxygen or nitrogen atoms.

The term "low surface energy surface" refers to a hydrophobic surface exhibiting an average surface energy of about 40 dynes/cm or less.

The phrase "molecular weight" when referring to a polymer means average molecular weight. This phrase also refers not only to the weight of a molecule, but also to the weight of a portion of a molecule, thus, for example, the phrase "molecular weight of the polymeric backbone" refers to the average molecular weight of the polymeric backbone portion of the molecule, and not to the average molecular weight of the molecule that contains the polymeric backbone portion of the molecule.

The term "polymer" refers to a large molecule composed of repeating structural units. Such repeating units are building blocks provided by polymerized monomers. Unless specifically excluded, the term "polymer" also refers to copolymers.

The term "substrate" refers to any material onto which a liquid ink is applied.

The term "mixture" refers to any composition that comprises more than one substance. The term refers to both a homogeneous and heterogeneous mixture. The term refers to any composition that comprises more than one substance, regardless of the morphology of the substances or the phase thereof. Thus, the term includes a solution, a suspension, a dispersion, a sol, a foam, a gel, an amalgam, an alloy, and like.

The name of an element when used to refer to a substituent or to a portion of a molecule or a polymer means that one of more atoms of that element are incorporated within the structure of that molecule, regardless whether the atom is found in the molecule as defined by the class the molecule or not. For example, the nitrogen in the phrase "a nitrogen-containing acrylamide" refers to both the nitrogen which is a part of the amide group, and to any nitrogen-containing groups that may be a substituent on the acrylamide.

The name of an element, or a group of elements, when used to refer to a substituent or to a portion of a molecule or a polymer, is used regardless of the oxidation state of that atom. For example, the term "a halogen" includes within its definition a halide.

One of the aspects of the present invention is a hybridized copolymer comprising:
(a) a hydrophobic functional polymeric backbone of an average molecular weight of from about 15,000 to about 200,000 g/mole, wherein the polymeric backbone comprises a polymer selected from the group consisting of a functional polysiloxane polymer, a functional polyolefin polymer, and a functional polyvinyl polymer; and
(b) a plurality of copolymeric side chains attached to the backbone, wherein one or more side chains comprises a reaction product of at least a polymerizable unsaturated monomer and a polymerizable amine-containing unsaturated monomer.

The hybridized copolymer may have many uses within the coating and film applications, but it is especially useful as a binder component in ink jet inks.

The hybridized copolymer is a graft copolymer. A graft copolymer is branched copolymer wherein the side chains are structurally distinct from the backbone. In the present invention the backbone of the graft copolymer is the hydrophobic functional polymeric backbone, and the side chains are copolymeric side chains attached to the backbone.

The copolymer of the present invention comprises at least a backbone and a plurality of copolymeric side chains. The backbone is a hydrophobic functional polymeric chain.

The polymeric chain that comprises the backbone can be either a functional homopolymer or a functional copolymer. The backbone comprises a functional polysiloxane polymer, a functional polyolefin polymer, a functional polyvinyl polymer, or any combination of the three. Under a preferred embodiment the backbone is a functional copolymer.

The functional polyolefin polymer is a polyolefin polymer that has covalent bonds to other parts of the molecule, namely to copolymeric side chains. Polyolefin polymer is a polymer produced from one or more alkene monomers with a general formula $C_n$-$C_{2n}$, wherein n is 2 to 8. Such alkenes may be linear or branched. Examples of alkenes include ethylene, propylene, butylene, pentene, and hexene. Examples of suitable polyolefins include functional polyethylene, functional polypropylene, functional polybutene, functional polyisobutylene, functional polymethylpentene, and copolymers thereof.

Under one embodiment of the present application, the polyolefin that is used in preparation of the hybridized copolymer of the present application is a polyolefin that acts as an adhesion promoter to TPO and polypropylene. Such adhesion promoter may be either chlorinated or non-chlorinated. Under one embodiment the adhesion promoter is non-chlorinated.

The functional polyvinyl polymer is a polyvinyl polymer that has covalent bonds to other parts of the molecule, namely copolymeric side chains. Polyvinyl polymer is a polymer produced from one or more vinyl monomers. Examples of vinyl monomers include vinyl chloride, vinyl acetate, and vinyl alcohol. Examples of suitable polyvinyl polymers include polyvinyl chloride, polyvinyl acetate, polyvinyl alcohol, and copolymers thereof.

Particularly suitable polyvinyl polymers that are copolymers of polyvinyl chloride, polyvinyl acetate and polyvinyl alcohol. It is a surprising and unexpected result that one of the preferred polyvinyl vinyl polymers comprises copolymer based on about 60% to 95% vinyl chloride, 2% to 10% vinyl acetate, and 2% to 10% vinyl alcohol.

The functional polysiloxane polymer is a polysiloxane polymer that has covalent bonds to other parts of the molecule, namely copolymeric side chains. Polysiloxane polymer is a linear polymer of formula $[RR'SiO]_n$, wherein R and R' are same or different organic groups such as hydrogen, alkyl, aryl, alkylaryl. Such alkyl groups may be linear or branched. Examples of suitable functional polysiloxane polymer include functional polydimethylsiloxane, functional polymethylhydrosiloxane, functional poly(methylhydro-co-dimethyl)siloxane, functional polyethylhydrosiloxane, functional polyphenyl-(dimethylhydro)siloxane, functional methylhydrosiloxane-phenylmethylsiloxane copolymer, functional methylhydrosiloxane-octylmethylsiloxane copolymer, and co-polymers of any two or more thereof.

Although the polymeric backbone may comprise a copolymer of functional polysiloxane units, or a copolymer of functional polyolefin units, or a copolymer of functional polyvinyl units, the polymeric backbone in the copolymer of the present invention may also be a combination of any of these three copolymers. It has been found that particularly useful is a copolymer of the present invention wherein the polymeric backbone is a copolymer of a functional polyvinyl polymer and a functional polysiloxane polymer. Alternatively, the backbone may comprise a copolymer of a functional polyvinyl polymer and a functional polyolefin polymer. Furthermore, the backbone may comprise a copolymer of a functional polyvinyl polymer, a functional polysiloxane polymer, and a functional polyolefin polymer.

The number average molecular weight of the polymeric backbone portion of the copolymer is chosen to be such that the molecule that is the synthetic precursor to the copolymer is soluble in organic solvents used in the reaction, and the resulting copolymer is soluble in water in the jet ink. The preferred molecular weight ($M_N$) is between about 15,000 and about 200,000 g/mole.

The weight ratio of the polymeric backbone in the hybridized copolymer of the present invention to the plurality of copolymeric side chains is selected so that the hybridized copolymer of the present invention provides for excellent water disperability of the hybridized copolymer. The preferred weight ratio of the polymeric backbone in the hybridized copolymer of the present invention to the plurality of copolymeric side chains is between 10:90 and 60:40.

In addition to a hydrophobic functional polymeric backbone, the hybridized copolymer of the present invention also comprises a plurality of copolymeric side chains attached to the backbone, wherein one or more side chains comprises a reaction product of at least (i) a polymerizable unsaturated monomer and (ii) a polymerizable amine-containing unsaturated monomer. Both polymerizable unsaturated and polymerizable amine-containing unsaturated monomers are needed in construction of a plurality of side chains, but additional material may be incorporated within any of the side chains.

The polymerizable unsaturated monomer which is the basis for one type of a building unit of the side chains is selected from a group consisting of an acrylate monomer, an alkacrylate monomer, an aromatic vinyl monomer, an aliphatic vinyl monomer, a vinyl ester monomer, a vinyl cyanogen-containing monomer, a halogenoid monomer, an olefin monomer, and a diene monomer. Although only one kind of a polymerizable unsaturated monomer may be used in preparation of any of the side chains, typically a several kinds of polymerizable unsaturated monomers are used.

The polymerizable unsaturated monomer which is the basis of one type of repeating units within the side chain of hybrid copolymer has the formula $$CH_2\!=\!C(R^2)\!-\!X\!-\!Y\!-\!R^1, \qquad \text{(Formula 1)}$$

wherein
—$R^2$ is H, halogen, or $C_1$ to $C_3$ alkyl group;
—X— is a bond, —CO—O—, or —O—CO—;
—Y— is a bond, or a $C_1$ to $C_{22}$ bridging alkyl group optionally substituted with one or more $C_1$ to $C_6$ alkyl groups; and —$R^1$ is
(1) H, halide, —OH, or —CN;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3{}_3$, wherein $R^3$ is $C_1$ to $C_3$ alkyl group;
(7) polyethylene glycol, polypropylene glycol, or a copolymer thereof, terminated with —OH or —OMe;
(8) —CZ=$CH_2$, wherein Z is H or halogen; or
(9) —CO—OH.

Halogen is an atom of the 17th Group of the period table, which includes fluorine, chlorine, bromine and iodine.

$C_1$ to $C_3$ alkyl group is a methyl group, ethyl group, n-propyl group, or a i-propyl group.

$C_1$ to $C_{22}$ bridging alkyl group is a saturated bridging group of formula —$(CH_2)_n$— wherein n is an integer 1 to 22. The term "alkyl" as used to refer to a bridging group, a divalent group, is referred under current IUPAC rules as "alkdiyl" group. This bridging group may be further substituted anywhere along the chain by a small terminal alkyl group such as methyl, ethyl, propyl, butyl, pentyl, hexyl, or an isomer any of the foregoing.

In cases when —X— is a bond, the formula $CH_2$=C$(R^2)$—X—Y—$R^1$, is reduced to formula $CH_2$=C$(R^2)$—Y—$R^1$. Likewise, when —Y— is a bond, the formula $CH_2$=C$(R^2)$—X—Y—$R^1$, is reduced to formula $CH_2$=C$(R^2)$—Y—Y—$R^1$. Furthermore, when both —X— and —Y— are bonds, the formula $CH_2$=C$(R^2)$—X—Y—$R^1$, is reduced to $CH_2$=C$(R^2)$—$R^1$.

The symbol —CN refers to a cyanyl group. The cyanyl group should be chemically inert vis-à-vis conditions in which the copolymer may be exposed in order to avoid hydrolysis of the cyanyl group.

Under one embodiment of the present invention, the polymerizable unsaturated monomer which is the basis for the side chains is an acrylate monomer, an alkacrylate monomer, or both. The acrylate monomer is of formula $CH_2$=C$(R^2)$—X—Y—$R^1$, wherein
—$R^2$ is H;
—X— is —CO—O—;
—Y— is a bond, or a $C_1$ to $C_{22}$ bridging alkyl group optionally substituted with one or more $C_1$ to $C_6$ alkyl groups; and
—$R^1$ is
(1) H or —OH;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy; or
(6) polyethylene glycol, polypropylene glycol, or a copolymer thereof, terminated with —OH or —OMe.

The acrylate monomer is also of formula $CH_2$=CH—CO—O—Y—Y—$R^1$, wherein
—Y— is a bond, or a $C_1$ to $C_{22}$ bridging alkyl group optionally substituted with one or more $C_1$ to $C_6$ alkyl groups; and
—$R^1$ is
(1) H or —OH;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy; or
(6) polyethylene glycol, polypropylene glycol, or a copolymer thereof, terminated with —OH or —OMe.

Examples of suitable acrylate are 2-hydroxyethyl acrylate, HEA, ethyl acrylate, methyl acrylate, n-propyl acrylate, i-propyl acrylate, n-butyl acrylate, i-butyl acrylate, t-butyl acrylate, n-pentyl acrylate, n-amyl acrylate, i-pentyl acrylate, isoamyl acrylate, n-hexyl acrylate, cyclohexyl acrylate, 2-ethylhexyl acrylate, octyl acrylate, i-octyl acrylate, decyl acrylate, isodecyl acrylate, dodecyl acrylate, lauryl acrylate, octadecyl acrylate, isobornyl acrylate, phenyl acrylate, benzyl acrylate, ethylene glycol methyl ether acrylate, glycidyl acrylate, and mixtures thereof. Under one embodiment of the invention the acrylate monomers that are the basis of the copolymeric side chain is 2-hydroxylethyl acrylate, ethyl acrylate, or a mixture thereof.

The alkylacrylates monomer is of formula $CH_2$=C$(R^2)$—X—Y—$R^1$, wherein
—$R^2$ is $C_1$ to $C_3$ alkyl;
—X— is —CO—O—;
—Y— is a bond, or a $C_1$ to $C_{22}$ bridging alkyl group optionally substituted with one or more $C_1$ to $C_6$ alkyl groups; and
—$R^1$ is
(1) H;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3{}_3$, wherein $R^3$ is $C_1$ to $C_3$ alkyl group;
(7) polyethylene glycol, polypropylene glycol, or a copolymer thereof, terminated with OH or OMe; or
(8) —CZ=$CH_2$, wherein Z is H or halogen.

One example of an alkylacrylate monomer is a methacrylate. Methacrylate has a formula $$CH_2=C(R^2)-X-Y-R^1,$$

wherein
—$R^2$ is $C_1$ alkyl;
—X— is —CO—O—;
—Y— is a bond, or a $C_1$ to $C_{22}$ bridging alkyl group optionally substituted with one or more $C_1$ to $C_6$ alkyl groups; and —R¹ is
(1) H;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3{}_3$, wherein $R^3$ is $C_1$ to $C_3$ alkyl group;
(7) polyethylene glycol, polypropylene glycol, or a copolymer thereof, terminated with OH or OMe; or
(8) —CZ=CH$_2$, wherein Z is H or halogen.

$C_1$ alkyl is a methyl group.

Examples of suitable methacrylates include methyl methacrylate, MMA, ethyl methacrylate, propyl methacrylate, isopropyl methacrylate, n-butyl methacrylate, i-butyl methacrylate, s-butyl methacrylate, t-butyl methacrylate, n-amyl methacrylate, isoamyl methacrylate, n-hexyl methacrylate, cyclohexyl methacrylate, 2-ethylhexyl methacrylate, octyl methacrylate, decyl methacrylate, dodecyl methacrylate, octadecyl methacrylate, behenyl methacrylate, lauryl methacrylate, isobornyl methacrylate (IBOMA), phenyl methacrylate, benzyl methacrylate, 1-naphthyl methacrylate, (trimethylsilyl)methacrylate, 9-anthracenylmethyl methacrylate, glycidyl methacrylate, polyethylene glycol monomethacrylate, polypropylene glycol monomethacrylate, and ethylene glycol propylene glycol monomethacrylate. Under one embodiment of the invention the methacrylate monomers that are the basis of the copolymeric side chain is methyl 2-methacrylate, behenyl methacrylate, or a mixture thereof.

The aromatic vinyl monomer is of formula $CH_2$=C$(R^2)$—R¹,
wherein
—R² is H or $C_1$ to $C_3$ alkyl group;
—R¹ is a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy.

Aryl groups are any hydrocarbon cyclic groups that follow the Hückel Rule. Such aryl groups may be single aromatic ring group, bicyclic aromatic ring group, or tricyclic aromatic ring group. An example of a single aromatic ring group is the phenyl group. An example of a bicyclic aromatic ring group is naphthalene. An example of a tricyclic aromatic ring group is anthracene. Any of the aromatic groups may be optionally substituted with one or more of any of the following: fluorine, chlorine, bromine, iodine, methyl, ethyl, propyl, butyl, pentyl, hexyl, methoxy, ethoxy, propyloxy, including any isomers thereof.

Examples of suitable aromatic vinyl monomer include styrene, alpha-methylstyrene, vinyl toluene, 4-t-butylstyrene, chlorostyrene, vinylanisole, and vinyl naphthalene.

The vinyl ester monomer is of formula

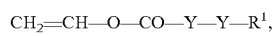

wherein
—Y— is a bond, or a $C_1$ to $C_{22}$ bridging alkyl group optionally substituted with one or more $C_1$ to $C_6$ alkyl groups; and —R¹ is
(1) H, halide, —OH, or —CN;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3{}_3$, wherein $R^3$ is $C_1$ to $C_3$ alkyl group;
(7) polyethylene glycol, polypropylene glycol, or a copolymer thereof, terminated with —OH or —OMe; or
(8) —CZ=CH$_2$, wherein Z is H or halogen.

An example of a suitable vinyl ester is vinyl acetate.

The vinyl cyanogen-containing monomer is an unsaturated monomer of Formula 1 that comprises a —CN group. Examples of cyanogen-containing monomer include acrylonitrile and methacrylonitrile.

The halogenoid monomer is an unsaturated monomer of Formula 1 that comprises one or more halogens. An example of a halogen includes fluorine, chlorine, bromine and iodine. An example of a halogenoid comprising one halogen is vinyl chloride. An example of a halogenoid comprising two halogens is vinylidene chloride.

The olefin monomer is of formula

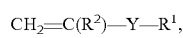

wherein
—R² is H, or $C_1$ to $C_3$ alkyl group;
—Y— is a bond, or a $C_1$ to $C_{22}$ bridging alkyl group optionally substituted with one or more $C_1$ to $C_6$ alkyl groups; and
—R¹ is H.

Examples of an olefin monomer include ethylene and propylene.

The diene monomer is of formula

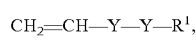

wherein
—Y— is a bond, or a $C_1$ to $C_{22}$ bridging alkyl group optionally substituted with one or more $C_1$ to $C_6$ alkyl groups; and
—R¹ is —CZ=CH$_2$, wherein Z is H or halogen.

An example of a diene monomer when Z=H is butadiene. An example of a diene monomer when Z is a halogen is chloroprene.

The polymerizable amine-containing unsaturated monomer which is the basis for one type of a building unit of the side chains is selected from a group consisting of an amine-containing acrylate, an amine-containing methacrylate, an acrylamide, a methacrylamide, and an amine-containing vinyl monomer. Although only one kind of a polymerizable unsaturated monomer may be used in preparation of any of the side chains, typically a several kinds of polymerizable unsaturated monomers are used.

The polymerizable amine-containing unsaturated monomer which is the basis of one type of repeating units within the side chain of hybrid copolymer has the formula $$CH_2=C(R^{n2})-X^n-Y^n-R^{n1}, \qquad \text{(Formula 2)}$$

wherein
—$R^{n2}$ is H, halogen, or $C_1$ to $C_3$ alkyl group;
—$X^n$— is a bond, —CO—O—, —CO—NH—, —CO—, —O—, or —S—;
—$Y^n$— is a bond, or a $C_1$ to $C_{18}$ bridging alkyl group optionally substituted with one or more $C_1$ to $C_6$ alkyl groups; and
—$R_{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with —OH or —OMe; and
wherein —$X^n$— or —$R^{n1}$ or both comprise nitrogen.

Pnicogen is an atom of the 15th Group of the periodic table, which includes nitrogen, phosphorus, arsenic and antimony.

Chalcogen is an atom of the 16th Group of the periodic table, which includes oxygen, sulfur, selenium, and tellurium.

Halogen is an atom of the 17th Group of the period table, which includes fluorine, chlorine, bromine and iodine.

$C_1$ to $C_3$ alkyl group is a methyl group, ethyl group, n-propyl group, or an i-propyl group.

$C_1$ to $C_{22}$ bridging alkyl group is a saturated bridging group of formula —$(CH_2)_n$— wherein n is an integer 1 to 22. The term "alkyl" as used to refer to a bridging group, a divalent group, is referred under current IUPAC rules as "alkdiyl" group. This bridging group may be further substituted anywhere along the chain by a small terminal alkyl group such as methyl, ethyl, propyl, butyl, pentyl, hexyl, or an isomer any of the foregoing.

In cases when —$X^n$— is a bond, the formula $CH_2=C(R^{n2})-X^n-Y^n-R^{n1}$, is reduced to formula $CH_2=C(R^{n2})-Y^n-R^{n1}$. Likewise, when —$Y^n$— is a bond, the formula $CH_2=C(R^{n2})-X^n-Y^n-R^{n1}$, is reduced to formula $CH_2=C(R^{n2})-Y^n-R^{n1}$. Furthermore, when both —$X^n$— and —$Y^n$— are bonds, the formula $CH_2=C(R^{n2})-X^n-Y^n-R^{n1}$, is reduced to $CH_2=C(R^{n2})-R^{n1}$.

The definition of amine containing unsaturated monomer also includes adducts of such monomers, such as salts, quaternary amine salts, and hydrates.

Under one embodiment of the present invention, the polymerizable amine-containing unsaturated monomer which is the basis for the side chains is an amine-containing acrylate monomer. The amine-containing acrylate monomer is of formula $$CH_2=CH-CO-O-Y^n-R^{n1}$$

wherein
—$Y^n$— is a bond, or a $C_1$ to $C_{18}$ bridging alkyl group optionally substituted with one or more $C_1$ to $C_6$ alkyl groups; and
—$R^{n1}$ is
(1) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; or
(4) a $C_6$ to $C_{14}$ aryl group further substituted with an amine-containing group.

When the polymerizable amine-containing unsaturated monomer which is the basis for the side chains is an amine-containing acrylate monomer of formula $CH_2=CH-CO-O-Y^n-R^{n1}$, then moiety —$R^{n1}$ comprises nitrogen.

Examples of suitable polymerizable amine-containing acrylate includes t-butylaminoethyl acrylate, dimethylaminomethyl acrylate, diethylaminoethyl acrylate, oxazolidinyl ethyl acrylate, aminoethyl acrylate, 4-(beta-acryloxyethyl)-pyridine, and 2-(4-pyridyl)-ethyl acrylate.

Under another embodiment of the present invention, the polymerizable amine-containing unsaturated monomer which is the basis for the side chains is an amine-containing methacrylate monomer. The amine-containing methacrylate monomer is of formula $$CH_2=C(CH_3)-CO-O-Y^n-R^{n1},$$

wherein
—$Y^n$— is a bond, or a $C_1$ to $C_{18}$ bridging alkyl group optionally substituted with one or more $C_1$ to $C_6$ alkyl groups; and
—$R^{n1}$ is
(1) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; or
(4) a $C_6$ to $C_{14}$ aryl group further substituted with an amine-containing group.

When the polymerizable amine-containing unsaturated monomer which is the basis for the side chains is an amine-containing acrylate monomer of formula $CH_2\!=\!C(CH_3)\!-\!CO\!-\!O\!-\!Y^n\!-\!R^{n1}$, then moiety $-R^{n1}$ comprises nitrogen.

Examples of suitable polymerizable amine-containing methacrylate include 2-aminoethyl methacrylate, t-butylaminoethyl methacrylate, 2-(diethylamino)ethyl methacrylate, dimethylaminomethyl methacrylate, diethylaminoethyl methacrylate, 2-dimethylaminoethyl methacrylate, DMAEMA, oxazolidinyl ethylmethacrylate, aminoethyl methacrylate, diethylaminohexyl methacrylate, 3-dimethylamino-2,2-dimethyl-propyl methacrylate, methacrylate of N-hydroxyethyl-2,4,4-trimethylpyrrolidine, 1-dimethylamino-2-propyl methacrylate, beta-morpholinoethyl methacrylate, 3-(4-pyridyl)-propyl methacrylate, 1-(4-pyridyl)-ethyl methacrylate, 1-(2-methacryloyloxyethyl)-2-imidazolidinone, Norsocryl 102, 3-(beta-methacryloxyethyl)-pyridine, 3-methacryloxypyridine and oxazolidinyl ethyl methacrylate.

Under one embodiment of the present invention the amine-containing methacrylate is selected from the group consisting of t-butylaminoethyl methacrylate, 2-dimethylaminoethyl methacrylate, DMAEMA, and 1-(2-methacryloyloxyethyl)-2-imidazolidinone.

The acrylimide is of formula

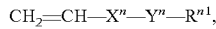
$CH_2\!=\!CH\!-\!X^n\!-\!Y^n\!-\!R^{n1}$, wherein
$-X^n-$ is $-CO-NH-$, or $-CO-$;
$-Y^n-$ is a bond, or a $C_1$ to $C_{18}$ bridging alkyl group optionally substituted with one or more $C_1$ to $C_6$ alkyl groups; and
$-R^{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with $-OH$ or $-OMe$; and
provided that when $-X^n-$ is $-CO-$, then $-X-$ is a bond and $-R^{n1}$ is (2).

Acrylamide that is a suitable polymerizable amine-containing unsaturated monomer which is the basis for the side chain of the copolymer of the present invention has a nitrogen as a part of the acrylimide group $CH_2\!=\!CH\!-\!CO\!-\!NH-$ or $CH_2\!=\!CH\!-\!CO\!-\!NR^{n3}R^{n4}$. Further, in addition to the nitrogen which is a part of the acrylamide group, acrylamide that is a suitable polymerizable amine-containing unsaturated monomer may have one or more additional nitrogen atoms on the $R^{n1}$ group, making each repeating unit have at least two nitrogens.

Examples of suitable acrylamides include N,N-dimethylacrylamide, NNDMA, N-acryloylamido-ethoxyethanol, N-t-butylacrylamide, N-diphenylmethyl acrylamide, and N-(beta-dimethylamino)ethyl acrylamide. Of these acrylkamides, N,N-dimethylacrylamide, NNDMA, and N-(beta-dimethylamino)ethyl acrylamide have two nitrogen atoms.

Under one embodiment of the invention the acrylamide is N,N-dimethylacrylamide, or NNDMA.

A methacrylamide is of formula

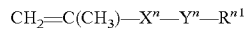
$CH_2\!=\!C(CH_3)\!-\!X^n\!-\!Y^n\!-\!R^{n1}$ wherein
$-X^n-$ is $-CO-NH-$, or $-CO-$;
$-Y^n-$ is a bond, or a $C_1$ to $C_{18}$ bridging alkyl group optionally substituted with one or more $C_1$ to $C_6$ alkyl groups; and
$-R^{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with $-OH$ or $-OMe$; and
provided that when $-X^n-$ is $-CO-$, then $-X-$ is a bond and $-R^{n1}$ is (2).

Methacrylamide that is a suitable polymerizable amine-containing unsaturated monomer which is the basis for the side chain of the copolymer of the present invention has a nitrogen as a part of the methacrylimide group $CH_2\!=\!C(CH_3)\!-\!CO\!-\!NH\!-\!$ or $CH_2\!=\!C(CH_3)\!-\!CO\!-\!NR^{n3}R^{n4}$. Further, in addition to the nitrogen which is a part of the acrylamide group, acrylamide that is a suitable polymerizable amine-containing unsaturated monomer may have one or more additional nitrogen atoms on the $R^{n1}$ group, making each repeating unit have at least two nitrogens.

Examples of suitable methacrylamides include N-(3-dimethylaminopropyl) methacrylamide and N-(beta-dimethylamino)ethyl methacrylamide. Both of these exemplary compounds contain two nitrogen atoms.

An amine-containing vinyl monomer is of formula

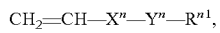
$CH_2\!=\!CH\!-\!X^n\!-\!Y^n\!-\!R^{n1}$, wherein
—$X^n$— is a bond, —O—, or —S—;
—$Y^n$— is a bond, or a $C_1$ to $C_{18}$ bridging alkyl group optionally substituted with one or more $C_1$ to $C_6$ alkyl groups; and
—$R^{n1}$ is
(1) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; and
(4) a $C_6$ to $C_{14}$ aryl group further substituted with an amine-containing group.

The copolymeric side chains that are attached to the hydrophobic functional polymeric backbone may optionally comprise additional components. Such components may be added within the structure of side chains, and may be used to improve the physical or chemical properties of the hybridized copolymer, such as the stability of the ink. One such component is a structural unit that acts as a UV absorber. Such a UV absorber will dissipate the energy that is absorbed by the printed ink thus mitigating the aging process of the printed ink. Such a UV absorber will absorb the UV radiation and prevent the formation of free radicals. Examples of UV absorbers that may be incorporated into the side chains include benzophenones, hindered amine light stabilizers, benzotriazoles, nickel quenchers, 2-(2'-hydroxy-5'-methacryloyloxy ethylphenyl)-2-H-benzotriazole, Ruva 93, bis(1,2,2,6,6-pentamethyl-4-piperidinyl)sebacate and methyl(1,2,2,6,6-pentamethyl-4-piperidinyl)sebacate, and bis(2,2,6,6-tetramethyl-4-piperidyl) sebacate.

The hybridized copolymer as described herein may have many uses within the coating and film applications, but it is especially useful as a binder in inks, particularly water based jet inks.

The advantage of the hybridized copolymer is to provide water based jet ink which when printed yields excellent adhesion properties on low energy surfaces and provides stability against common cleaners.

The hybridized copolymer may be easily mixed with water, to yield a homogenous mixture. Such an aqueous mixture may be characterized as a manufacturing use product, which may then further used in the process of preparing of an ink. The definition of phrase "aqueous mixture" as referring to the aqueous mixture of hybridized copolymer also includes any aqueous mixture comprising the hybridized copolymer which may be conveyed to the same or another manufacturer of ink products, including a manufacturing intermediate, a partially formulated ink, or a fully formulated ink. The ink is preferably a jet ink.

The aqueous mixture of the hybridized copolymer may comprise a colloidal dispersion suitable for use in preparation of a water based jet ink vehicle, wherein the particle size of more than 60% of particles of the dispersion is less than 1000 nanometers. Preferably, the particle size of more than 80% of particles in the dispersion is less than 750 nanometers. More preferably, the particle size of more than 90% of particles in the dispersion is less than 500 nanometers. The particle size refers to the median size of particles of the hybridized polymer.

Stability testing of an aqueous mixture, or a dispersion, of the hybridized polymer shows that the aqueous mixture is stable with respect to several physical characteristics, including viscosity and particle size distribution. Viscosity as measured via Zahn cup, showed that viscosity of the aqueous mixture did not change within 10% after being exposed for 14 days at 60° C. Particle-size distribution, as measured by static light scattering showed that the particle size distribution did not change within 10% after being exposed for 14 days at 60° C.

Binders in jet inks are traditionally difficult to dissolve or disperse in an aqueous solution. To aide with the mixing, homogenization, dispersement or dissolution, a surfactant or a mixture of surfactants is typically added to the mixture. It is thus unexpected and not predictable that the hybridized copolymer of the present invention mixes well with water without the need to resort to a surfactant.

The hybridized copolymer as described herein is particularly suitable for use in formulating of a liquid ink. The liquid ink so formulated with the hybridized copolymer may any type of a liquid ink, but the hybridized copolymer is particularly suitable for jet ink. Jet ink, otherwise known as inkjet ink, is used in inkjet printers that create an image by propelling droplets of such ink onto a substrate. The jet ink as herein may be used within the continuous inkjet technology, thermal drop-on-demand technology, or piezoelectric drop-on-demand technology.

A liquid ink formulation of the present invention comprises about 4 to about 9 weight percent hybridized copolymer, about 1 to about 5 weight percent pigment or dye, 0 to about 25 weight percent of additives required for performance such as antimicrobial agents, co-solvents or UV stabilizers and balance is water.

The liquid ink may further comprise a co-solvent. Under one embodiment of the present invention the co-solvent is miscible with water. Examples of a water-miscible co-solvent include propylene glycol, 2-propanol, 1,2-hexanediol, propylene glycol methyl ether, dipropylene glycol methyl ether, diethylene glycol, diethylene dimethyl ether, diethylene glycol diethyl ether, Texanol™, 2,2,4-trimethyl-1,3-pentanediol monoisobutyrate, and methyl pyrrolidone.

When co-solvents are used, the liquid inks of the present invention are formulated to comprise about 4 to about 9 weight percent hybridized copolymer, about 1 to about 5 weight percent pigment or dye, up to about 15% co-solvent, up to about 10% of other specific additives required for performance such as antimicrobial agents, UV stabilizers, defoamers and balance is water.

Under another embodiment of the present invention, the co-solvent is not fully miscible with water. Such a co-solvent may act on the interface of water and the hydrophobic portion of the copolymer. Such a co-solvent is adsorbed into the hydrophobic portion of the hybridized co-polymer.

The pigment as used in the liquid ink is not particularly limited, and any of an inorganic pigment and an organic pigment may be used. Examples of the inorganic pigment include titanium dioxide and iron oxide. Further, a carbon black produced by a known method such as a contact method, a furnace method, or a thermal method can be used.

Examples of the organic pigment include an azo pigment (such as an azo lake pigment, an insoluble azo pigment, a condensed azo pigment, or a chelate azo pigment), a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment), a dye chelate (such as a basic dye type chelate, or an acid dye type chelate), a nitro pigment, a nitroso pigment, Aniline Black or the like can be used.

Specific examples of the carbon black which is used as the black ink include No. 2300, No. 900, MCF88, No. 33, No. 40, No. 45, No. 52, MA7, MA8, MA100, and No. 2200B (all of which are manufactured by Mitsubishi Chemical Corporation), Raven 5750, Raven 5250, Raven 5000, Raven 3500, Raven 1255, and Raven 700 (all of which are manufactured by Birla Carbon), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all of which are manufactured by Cabot Corporation), and Color Black FW1, Color Black FW2, Color Black FW2V, Color Black FW18, Color Black FW200, Color Black 5150, Color Black S160, Color Black S170, Printex 35, Printex U, Printex V, Printex 1400, Special Black 6, Special Black 5, Special Black 4A, and Special Black 4 (all of which are manufactured by Orion Engineered Carbons).

Specific examples of the pigment which is used in the yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Specific examples of the pigment which is used in the magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Specific examples of the pigment which is used in the cyan ink include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, and C.I. Vat Blue 60.

The liquid ink of the present invention may be applied to any substrate on which inkjet inks are typically applied, including porous materials. Upon application of ink droplets onto a porous substrate, the ink wets the substrate, the ink penetrates into the substrate, and volatile components of the ink evaporate, leaving a dry mark on the substrate. Examples of porous substrates include paper, paperboard, cardboard, woven fabrics, and non-woven fabrics.

It is an unexpected result that the liquid ink of the present invention may be also successfully applied to non-porous substrates. Examples of non-porous substrates include glossy coated paper, glass, ceramics, polymeric substrate, and metal.

The liquid ink of the present invention is particularly suitable for use on polymeric substrates. Examples of polymeric substrates include polyolefin, polystyrene, polyvinyl chloride, nylon, polyethylene terephthalate, high-density polyethylene, low-density polyethylene, polypropylene, polyester, polyvinylidene chloride, urea-formaldehyde, polyamides, high impact polystyrene, polycarbonate, polyurethane, phenol formaldehyde, melamine formaldehyde, polyetheretherketone, polyetherimide, polylactic acid, polymethyl methacrylate, and polytetrafluoroethylene.

The liquid ink of the present invention is also suitable for use on metal substrates. Examples of metal substrates include base metals, ferrous metals, precious metals, noble metals, copper, aluminum, steel, zinc, tin, lead, and any alloys thereof.

The liquid ink of the present invention is also suitable for use of high surface energy substrates. Examples of high surface energy substrates include phenolic, Nylon, alkyd enamel, polyester, epoxy, polyurethane, acrylonitrile butadiene styrene copolymer, polycarbonate, rigid polyvinyl chloride, and acrylic.

The liquid ink of the present invention is also suitable for use of low surface energy substrates. Examples of low surface energy substrates include polyvinyl alcohol, polystyrene, acetal, ethylene-vinyl acetate, polyethylene, polypropylene, polyvinyl fluoride, and polytetrafluoroethylene. Upon application to a low energy substrate, the volatizable components of the ink evaporate to yield a coating on the substrate. Such a coating is resistant to water or cleaning solvents.

Upon application of the liquid ink to the substrate, the volatile portions of the ink evaporate, leaving behind a residue or a coating on the substrate. The adhesion of the coating to the non-porous substrate is a crucial characteristic of the liquid ink. It surprising that the liquid ink of the present invention yields a finished coating that is also resistant to water or a cleaning solvent.

The cleaning solvent as used to clean such substrates are the typical household cleaners, such as general purpose cleaner, bathroom cleaner, disinfectant, scouring cleanser, glass cleaner, carpet or upholstery cleaner, spot or stain remover, and toilet bowl cleaner. Such cleaners comprise a wide variety of ingredients, including surfactants, builders, solvents, antimicrobials, and other additives.

Surfactants in the cleaning solvent include anionic surfactants, nonionic surfactants, cationic surfactants, and amphoteric surfactants. Examples of anionic surfactants include linear alkylbenzene sulfonates such as sodium dodecylbenzene sulfonate, dodecylbenzene sulfonate, and sodium laurylbenzene sulfonate; alpha sulfo methyl ester, alpha sulfo acid ester, alkyl polyglucoside, alkyl polyglycoside, alcohol sulfate such as lauryl sulfate, alcohol ether sulfate such as lauryl ether sulfate and laureth sulfate, lauryl sarcosinate, and soap. Examples of nonionic surfactants include alcohol ethoxylate such as linear alcohol ethoxylate and primary alcohol ethoxylate, ethoxylated alcohol, alcohol polyethylene glycol ether, lauryl amine oxide, nonylphenol ethoxylate, octylphenol ethoxylate, and cocoamide diethanolamide. Examples of cationic surfactants include $C_8$ to $C_{12}$ dialkyl dimethyl ammonium chloride, alkyl dimethyl benzyl ammonium chloride, alkyl dimethyl ethylbenzyl ammonium chloride, hexadecyl trimethyl ammonium bromide, and quaternary ammonium chloride.

Builders include a range of both organic and inorganic chemicals whose function is to improve the performance of the surfactants. Builders are used to adjust or maintain the pH of the washing solution; soften water by removing calcium and other metal ions; and boost, reduce, or maintain foam height. Examples of builders include acetic acid, calcium carbonate, calcium chlorate, calcium chloride, calcium hydroxide, citric acid, diethanolamine, monoethanolamine, potassium hydroxide, potassium silicate, sodium metasilicate, potassium hydroxide, sodium bicarbonate, sodium bisulfate, sodium carbonate, sodium chloride, sodium citrate, sodium EDTA, sodium hydroxide, sodium sesquicarbonate, sodium silicate, sodium sulfate, sodium tripolyphosphate, tetrapotassium pyrophosphate, triethanolamine, and trisodium phosphate.

The cleaning solvent comprises one or more solvents, aside from water, which are added to help dissolve oil and grease. Examples of solvents in the cleaning solvent include acetone, almond oil, ammonia, ammonium hydroxide, apricot kernel oil, t-butyl alcohol, 1,2-butylene oxide, citronella oil, citrus oil (d-limonene, orange oil, lime oil), diethylene glycol monobutyl ether, 2,2-butoxyethoxy ethanol, butyl diglycol, dimethoxymethane, dipropylene glycol methyl ether, ethanol, ethylene glycol ethyl ether, ethylene glycol monobutyl ether, 2-butoxyethanol, eucalyptus oil, glycerine, 1,2,3-propanetriol, hexylene glycol, isopropanol, lavender oil, mineral oil, naphtha, peppermint oil, pine oil, pinene, propylene glycol, propylene glycol ether, propylene glycol methyl ether, 1-methoxy-2-propanol, rosemary oil, toluene, 1,1,1-trichloroethane, and xylene.

Antimicrobials are pesticides which kill bacteria, fungus, or mildew on surfaces. Examples of antimicrobials in the cleaning solvent include calcium hypochlorite, dialkyl dimethyl ammonium, octyl chloride, decyl chloride, didecyl chloride, alkyl dimethyl benzyl ammonium chloride, alkyl dimethyl ethylbenzyl ammonium chlorides, calcium hypochlorite, glutaraldehyde, o-benzyl-p-chloro phenol, o-phenyl phenol, sodium dichloro-s-triazinetrione, sodium hypochlorite, and sodium trichloro-s-triazinetrione.

The cleaning solvent may further comprise other ingredients, such as abrasives, fragrances, dyes, thickeners, hydrotopes, and preservatives. A hydrotope is a substance which keeps a cleaning solvent from separating. Examples of such ingredients include aloe vera, carbon dioxide, chalk, 1-(3-chloroallyl)-3,5,7-triaza-1-azoniaadamantane chloride, clay, denatonium benzoate, Bitrex, amylase enzyme, proteinase enzyme, extract of berberis, extract of marigold, feldspar, fluoraliphatic acid salt, hydrochloric acid, hydroxyacetic acid, isobutane, magnesium oxide, methylparaben, methyl salicylate, oxalic acid, o-benzyl-p-chlorophenol, phenylmethanol, phenylcarbinol, phosphoric acid, propane, propylparaben, silica, amorphous, silica, crystalline, sodium cumene sulfonate, sodium naphthalene sulfonate, sodium octane sulfonate, sodium perborate, borax, sodium xylene sulfonate, styrene maleic anhydride resin, sulfamic acid, urea, witch hazel, and xanthan gum.

Another aspect of the present invention is the process for preparing the hybridized copolymer which may be used for preparation of the liquid ink. There are three processes that can be used to prepare the hybridized copolymer: three part synthesis process, two part synthesis process, and single part synthesis process.

In the three part synthesis process for preparing the hybridized copolymer, comprises the steps of
(a) reacting a functionalized hydrophobic polymer of an average molecular weight from about 15,000 to about 200,000 g/mole, with a hybridizing compound to create a reaction mixture;
(b) adding a first monomer component to the reaction mixture;
(c) adding a second monomer component to the reaction mixture; and
(d) neutralizing the reaction mixture with an acid;
wherein the hydrophobic polymer is selected from the group consisting of a polysiloxane polymer, a polyolefin polymer, a polyvinyl polymer, and a combination thereof;
wherein either of the monomer components or both of the monomer components comprise a polymerizable unsaturated monomer; and
wherein either of the monomer components or both of the monomer components comprises a polymerizable amine-containing unsaturated monomer.

The preparation for the hybridized copolymer may add one or more additional steps before steps (a), (b), (c), and (d). The preparation for the hybridized copolymer may add one or more additional steps after steps (a), (b), (c), and (d). The preparation for the hybridized copolymer may add one or more additional steps between any of the steps (a), (b), (c), and (d). Such additional steps may include adding further reactants, adding a third or fourth or additional monomer components to the reaction mixture, changing the reaction conditions, working up the reaction mixture, and purifying any of reactants.

Further, any of the individual steps (a), (b), (c), and (d) may comprise additional necessary components or sub-steps in order to prepare the hybridized copolymer. For example, in addition to the two components mentioned in step (a), namely the functionalized hydrophobic polymer and the hybridizing compound, this step typically also requires additional components such as a solvent and a catalyst.

In step (a) of the three part synthesis of the hybridized copolymer, the functionalized hydrophobic polymer is reacted with a hybridizing compound. The molecular weight of the functionalized hydrophobic polymer is selected such that the functionalized hydrophobic polymer is soluble in organic solvents used in the reaction, and that the resulting copolymer is soluble in water in the jet ink. The functionalized hydrophobic polymer has an average molecular weight in the range between 15,000 g/mol to 200,000 g/mol. Under one embodiment of the invention, the average molecular weight is in the range from 15,000 g/mol to 50,000 g/mol.

The reaction of the functionalized hydrophobic polymer with a hybridizing compound results a reaction mixture. The reaction mixture at the end of step (a) comprises the reaction product of the reaction of the functionalized hydrophobic polymer with a hybridizing compound, any compound that was added in excess, and other compounds, such as a solvent, or a catalyst.

The molar ratio of the functional groups on the functionalized hydrophobic polymer to the hybridizing compound is selected so that all, or nearly all, of the functional groups on the functionalized hydrophobic polymer are reacted with the The functionalized hydrophobic polymer is a functionalized polysiloxane polymer, or a functionalized polyolefin polymer, or a functionalized polyvinyl polymer, or a copolymer of any of these three functionalized polymers. Under a preferred embodiment the functionalized hydrophobic polymer is a functionalized hydrophobic copolymer.

The functionalized polyolefin polymer is a polyolefin polymer that contains functional groups which are used to attach the side chains in further steps of the reaction. Polyolefin polymer is a polymer produced from one or more alkenes with a general formula $C_nH_{2n}$, wherein n is 2 to 8. Such alkenes may be linear or branched. Examples of alkenes include ethylene, propylene, butylene, pentene, and hexene. Examples of suitable polyolefins include functionalized polyethylene, functionalized polypropylene, functionalized polybutene, functionalized polyisobutylene, functionalized polymethylpentene, and copolymers thereof.

Under one embodiment of the present application, the polyolefin that is used in preparation of the hybridized copolymer of the present application is a polyolefin that acts as an adhesion promoter to thermoplastic olefin and polypropylene. Such adhesion promoter may be either chlorinated or non-chlorinated. Under one embodiment the adhesion promoter is non-chlorinated. Examples of chlorinated polyolefins include chlorinated polypropylene, such as Superchlon 822S, 892LS, 930S, 803LS, 803MWS, 833S, and 814HS. It has been found that the non-chlorinated version of polyolefin may work better than the chlorinated version. An example of non-chlorinated version of an adhesion promoter includes Eastman AP 550-1, Hardlen CY 9122P, Superchlon 892L.

The functionalized polyvinyl polymer is a polyvinyl polymer that contains functional groups which are used to attach the side chains in further steps of the reaction. Polyvinyl polymer is a polymer produced from one or more vinyl monomers. Examples of vinyl monomers include vinyl chloride, vinyl acetate, and vinyl alcohol. Examples of suitable polyvinyl polymers include polyvinyl chloride, polyvinyl acetate, polyvinyl alcohol, and copolymers thereof.

Particularly suitable polyvinyl polymers that are copolymers of polyvinyl chloride, polyvinyl alcohol and polyvinyl acetate. It is a surprising and unexpected result that one of the preferred polyvinyl vinyl polymers comprises copolymer based on about 60% to 95% vinyl chloride, 2% to 10% vinyl acetate, and 2% to 10% vinyl alcohol.

The functionalized polysiloxane polymer is a polysiloxane polymer that has covalent bonds to other parts of the molecule, namely copolymeric side chains. Polysiloxane polymer is a linear polymer of formula $[RR'SiO]_n$, wherein R and R' are same or different organic groups such as hydrogen, alkyl, aryl, or alkylaryl. Such alkyl groups may be linear or branched. Examples of suitable functionalized polysiloxane polymer include functionalized polydimethylsiloxane, functionalized polymethylhydrosiloxane, functionalized poly(methylhydro-co-dimethyl)siloxane, functionalized polyethylhydrosiloxane, functionalized polyphenyl-(dimethylhydro)siloxane, functionalized methylhydrosiloxane-phenylmethylsiloxane copolymer, functionalized methylhydrosiloxane-octylmethylsiloxane copolymer, and co-polymers of any two or more thereof.

Although the functionalized hydrophobic polymer may comprise a homopolymer of functionalized polysiloxane units, or a homopolymer of functionalized polyolefin units, or a homopolymer of functionalized polyvinyl units, the functionalized hydrophobic polymer in the hybridized copolymer of the present invention may also be a combination of any of these three copolymers. It has been found that a particularly suitable functionalized hydrophobic polymer is the copolymer of a functionalized polyvinyl polymer and a functionalized polysiloxane polymer. Alternatively, the functionalized hydrophobic polymer may comprise a copolymer of a functionalized polyvinyl polymer and a functionalized polyolefin polymer. Furthermore, the functionalized hydrophobic polymer may comprise a copolymer of a functionalized polyvinyl polymer, a functionalized polysiloxane polymer, and a functionalized polyolefin polymer.

Under one embodiment the functionalized hydrophobic polymer comprises 5 to 60 weight percent of a functionalized polyvinyl polymer.

The functionalized hydrophobic polymer described above is reacted with a hybridizing compound. The hybridizing compound is a compound that reacts with at least one of the functionalized groups on the functionalized hydrophobic polymer, so that additional monomers may be added to the functionalized hydrophobic polymer via a polymerization reaction. The hybridizing compound reacts with the functional group of the functionalized hydrophobic polymer to yield a functionalized hydrophobic polymer substituted with a plurality of alkene groups (—CR=CH$_2$, wherein R is H or $C_1$ to $C_3$ alkyl group). Any of the alkene groups on the functionalized hydrophobic polymer is then capable of reacting readily with either a polymerizable unsaturated monomer or a polymerizable amine-containing unsaturated monomer via a polymerization reaction in step (b) of the three-parts synthesis.

The hybridizing compound comprises (1) a first functional group that is an alkene or is easily converted into an alkene, (2) a second functional group that is capable of reacting readily to the functional group of the functionalized hydrophobic polymer, to generate a bond between the former functionalized hydrophobic polymer and a portion of the former hybridizing compound, and (3) a divalent bridging group connecting the first functional group and the second functional group. It is important that after the reaction of the hybridizing compound and the functionalized hydrophobic polymer, that the resulting polymer comprises a plurality of alkene groups or are easily converted into alkene groups.

The hybridizing compound has a formula

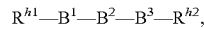

wherein $R^{h1}$— is the first functional group on the hybridizing compound, —$R^{h2}$ is the second functional group on the hybridizing compound. The assembly —$B^1$—$B^2$—$B^3$— represents the divalent bridging group connecting the first functional group to the second functional group, wherein any of —B1-, —B2-, and —B3-, are each independently a bond, an alkyl bridging group, a cycloalkyl bridging group or an aryl bridging group.

The alkyl bridging group may be further substituted with one or more of the following: a terminal alkyl, a terminal cycloalkyl or a terminal aryl group. The cycloalkyl bridging group may be further substituted with one or more of the following: a terminal alkyl, a terminal cycloalkyl or a terminal aryl group. The aryl bridging group may be further substituted with one or more of the following: a terminal alkyl, a terminal cycloalkyl or a terminal aryl group.

The first functional group on the hybridizing compound is any alkene group which is capable of further polymerization with a polymerizable unsaturated monomer and a polymerizable amine-containing unsaturated monomer. Examples of such alkene groups include vinyl, allyl, isopropenyl, 1-methylvinyl, —CH=CH$_2$, —CH$_2$—CH=CH$_2$, —CH$_2$—CMe=CH$_2$, and —CH=CH—CH$_3$. The first functional group on the hybridizing compound is also an alkene precursor which may be reacted to yield an alkene group. Alkenes may be prepared by any known method, as long as the alkene preparative reaction does not react with other portions of the polymer. Examples of preparation of alkenes includes alkyne reduction and beta-elimination reactions such as dehydration of alcohols, dehydrohalogenation of alkyl halides, and vicinal dihalide dehalogenation.

The second functional group on the hybridizing compound is a group that is reactive towards the functional group on the functionalized hydrophobic polymer, to generate a bonding group between the functionalized hydrophobic polymer and a portion of the former hybridizing compound. Examples of suitable second functional groups include an isocyanate, an amino, an epoxy, a hydroxy, a carboxylic acid, an acyl halide.

The bonding group is a divalent group spanning the functional hydrophobic polymer and the portion of the former hybridizing compound. When the functional group on the functionalized hydrophobic polymer is a hydroxyl group, then the bonding group may be an ester linkage, an ether linkage, or a carbamate linkage.

When the functional group on the functionalized hydrophobic polymer is a hydroxy group, and the second functional group on the hybridizing compound is a carboxylic acid, then under appropriate reaction conditions the ester linkage is formed.

When the functional group on the functionalized hydrophobic polymer is a hydroxy group, and the second functional group on the hybridizing compound is an acyl halide group, then under appropriate reaction conditions the ester linkage is formed.

When the functional group on the functionalized hydrophobic polymer is a hydroxy group, and the second functional group on the hybridizing compound is a second hydroxy group, then under appropriate reaction conditions the ester linkage is formed. Such conditions may include dehydration under acidic conditions.

When the functional group on the functionalized hydrophobic polymer is a hydroxy group, and the second functional group on the hybridizing compound is an isocyanate group, then under appropriate reaction conditions the carbamate linkage is formed.

Examples of the second functional group includes a hydroxy group, a carboxylic acid group, an acyl halide group, and an isocyate group.

Example of hybridizing compounds include 3-isopropenyl-α,α-dimethylbenzyl isocyanate, CH$_2$=CMe-C$_6$H$_4$—CMe$_2$-NCO, and isocyanatoethyl methacrylate.

The number of side chains on the backbone is largely controlled by the number of functional groups on the functionalized hydrophobic polymer; because each of the functional groups is potentially an attachment point for a side chain, the higher the number of functional groups on the functionalized hydrophobic polymer, the higher the number of side chains per molecule of functionalized hydrophobic polymer that may be potentially be bound to the backbone. In order to take an advantage of a functional group on the functionalized hydrophobic polymer to act as an attachment site for a side chain, the functional group must react with a hybridizing compound.

In order to achieve full substitution, wherein essentially all of the functional groups that can be readily reacted are to act as an attachment site for a side chain, a molar ratio of the hybridizing compound to the functional group on the functionalized hydrophobic polymer is 1:1 or slightly higher. This ratio may be in the range 1:1 to 1.3:1. The slight molar excess of the hybridizing compound may be needed to achieve a full substitution. However, molar excess that is too high is not desirable, because high levels of unreacted hybridizing compound may cause undesirable side reactions.

In cases where it is desirable to have a lower number of side chains on the backbone, a functionalized hydrophobic polymer with a lower number of functional groups should be selected. In cases where it is desirable to have a high number of side chains on the backbone, a functionalized hydrophobic polymer with a higher number of functional groups should be selected.

Alternatively, it is possible regulate the number of side chains for any given backbone by adjusting the molar ratio of the hybridizing compound to the functional group on the functionalized hydrophobic polymer. The molar ratio in the range from more than 0:1 to less than 1:1 yields a hybridized copolymer wherein only a portion of the functional groups have been replaced with a side chain. For example, if the molar ratio of first monomer component to the functional groups on the functionalized hydrophobic polymer is 0.5:1, then only about half the functional groups will be replaced with a side chain.

The reaction of the functionalized hydrophobic polymer with the hybridizing compound in step (a) of the three part synthesis of the hybridized copolymer may take place neat, i.e., without any other compounds present. Under a different embodiment this reaction takes place in presence of additional materials. Such materials include solvents, catalysts, initiators.

The solvent for step (a) of the synthesis of the hybridized copolymer, the reaction of the functionalized hydrophobic polymer with the hybridizing compound, is a solvent which dissolves or disperses both the functionalized hydrophobic polymer and the hybridizing compound. Any commonly used solvent is appropriate, as long as the functionalized hydrophobic polymer, the hybridizing compound, the reaction product of the reaction of functionalized hydrophobic polymer with a hybridizing compound, the first monomer component, and the second monomer components are soluble or dispersible within the solvent and they do not react with the solvent. Suitable solvents diluents for step (a) of the above reaction is an inert organic liquid. Examples of such a solvent includes mineral oil; straight and branched-chain hydrocarbons, such as pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; halogenated hydrocarbons such as dichloromethane, chloroform, carbon tetrachloride, perfluorinated $C_5$ to $C_{10}$ alkanes; chlorobenzenes; aromatic and alkylsubstituted aromatic compounds, such as benzene, toluene, mesitylene, and xylene; ethers, such as diethyl ether, tetrahydrofuran; ketones, such as acetone, methyl ethyl ketone; dimethyl sulfoxide; and acetonitrile.

In addition to the inert organic liquids, labile solvents may be used during the preparation of the hybridized copolymer, if added in an appropriate sequence. Examples of these solvents include alcohols, such as butanol, isopropanol, n-propanol, ethanol, and methanol. Such labile solvents generally are difficult to use as solvents of the reaction of the hybridizing compound with the functionalized hydrophobic polymer, because such labile solvents may react with the hybridizing compound. Such labile solvents may be added to the reaction mixture only after the reaction of the hybridizing compound with the functionalized hydrophobic polymer is complete. However, care must be taken not to use such labile solvents that may interfere with the polymerization reaction of the side chains after the addition of the first and second monomer component.

The catalyst added to the mixture in step (a) of the preparation of the hybridized copolymer is any compound which helps with controlling or advancing the reaction of the hybridizing compound with the functionalized hydrophobic polymer. Suitable catalysts includes those catalysts which are known to accelerate the reaction between hydroxyl groups and isocyanate groups. Such catalysts include tertiary amines, including, for example triethylamine, tributylamine, N-methylmorpholine, N-ethylmorpholine, N-cocomorpholine, N,N,N',N'-tetramethylethylenediamine, 1,4-diazabicyclo[2.2.2]octane, N-methyl-N'-dimethylaminoethylpiperazine, N,N-dimethylcyclohexylamine, N,N,N',N'-tetramethyl-1,3-butanediamine, N,N-dimethylimidazole-beta-phenylethylamine, 1,2-dimethylimidazole and 2-methylimidazole. Other suitable catalysts include organic metal catalysts, especially organic bismuth catalysts such as, for example, bismuth(III) neodecanoate, or organic tin catalysts such as, for example, tin(II) salts of carboxylic acids, such as tin(II)acetate, tin(II) octoate, tin(II) ethylhexanoate and tin(II) laurate, and the dialkyltin salts of carboxylic acids, such as dibutyltin diacetate, dibutyltin dilaurate, dibutyltin maleate or dioctyltin diacetate. These catalysts can also be used alone or in combination with other catalysts. It is preferable to use from 0 to 5 weight percent, more preferably from 0.3 to 2.0 weight percent of a catalyst or a catalyst combination, based on the total weight of the reactants. In another embodiment, the catalyst added to the mixture in step (a) of the preparation of the hybridized copolymer is an additive that catalyzes further reaction of the resulting compound with a polymerizable unsaturated monomer, or a polymerizable amine-containing unsaturated monomer, or both.

The reaction of the functionalized hydrophobic polymer with a hybridizing compound results a reaction mixture, which can then be reacted further. Step (b) follows step (a), either immediately, after some intermediate steps that follow step (a) and precede step (b).

In step (b), the first monomer component is added to the reaction mixture. Upon addition of the first monomer component, the monomers comprising the first monomer component react with the reaction product of functionalized hydrophobic polymer and hybridizing compound, to create a hybridized copolymer intermediate. The first monomer component upon exposure to the reaction mixture reacts with the alkene groups on the functionalized hydrophobic polymer that has been reacted with the hybridizing compound, wherein the alkene corresponds to the first functional group on the hybridizing compound.

The molar ratio of the monomers of the first monomer component to the alkene groups on the functionalized hydrophobic polymer determines the length of the copolymeric side chains on the hybridized copolymer intermediate. For example, for a molar ratio of 10:1, the average length of the side chain on the hybridized copolymer intermediate will be 10 units.

The first monomer component comprises either a polymerizable unsaturated monomer or a polymerizable amine-containing unsaturated monomer or a mixture thereof. The first monomer component may comprise a polymerizable unsaturated monomer. The first monomer component comprises a polymerizable amine-containing unsaturated monomer. The first monomer component may comprise a polymerizable unsaturated monomer and a polymerizable amine-containing unsaturated monomer. The first monomer component may comprise a plurality of polymerizable unsaturated monomers. The first monomer component may comprise a plurality of polymerizable amine-containing unsaturated monomers. The first monomer may comprise a plurality of polymerizable unsaturated monomer and a polymerizable amine-containing unsaturated monomer. The first monomer component may comprise a polymerizable unsaturated monomer and a plurality of polymerizable amine-containing unsaturated monomers. The first monomer component may comprise a plurality of polymerizable unsaturated monomers and a plurality of polymerizable amine-containing unsaturated monomers.

The first monomer component may comprise only one or more monomers. Additionally, the first monomer component may comprise additional additive. An example of such an additive includes a solvent, a diluent, a catalyst, an initiator, a hybridizing compound, chain transfer agent and a UV absorber. A description of possible solvents, catalysts, initiators, hybridizing compounds, and UV absorbers is presented further below.

The reaction of the first monomer component with the reaction product of the reaction of the functionalized hydrophobic polymer with the hybridizing compound, produces the hybridized copolymer intermediate. The hybridized copolymer intermediate has a backbone and a plurality of side chains. The side chains are the product of the polymerization reaction of the monomers of the first monomer component. The hybridized copolymer intermediate differs from the hybridized copolymer in that the hybridized copolymer intermediate has shorter side chains. The side chains are extended by reacting the hybridized copolymer intermediate with the second monomer mixture, wherein the monomers of the second monomer mixture polymerize to extend the side chains.

The hybridized copolymer intermediate is then reacted further with the second monomer component. Step (c) follows step (b), either immediately, after some intermediate steps that follow step (b) and precede step (c).

In step (c), the second monomer component is added to the reaction mixture. Upon addition of the second monomer component, the monomers comprising the second monomer component react with the hybridized copolymer intermediate to create a pre-neutralized hybridized copolymer. The monomers comprising the first monomer component upon exposure to the hybridized copolymer intermediate polymerize with the polymerized monomers of the first monomer component, thus extending the side chains.

The molar ratio of the monomers of the second monomer component to the existing side chains determines the extension of the copolymeric side chains. For example, for a molar ratio of 10:1, the average length of the extension of the side chain will be 10 units.

The second monomer component comprises either a polymerizable unsaturated monomer or a polymerizable amine-containing unsaturated monomer or a mixture thereof. The second monomer component may comprise a polymerizable unsaturated monomer. The second monomer component comprises a polymerizable amine-containing unsaturated monomer. The second monomer component may comprise a polymerizable unsaturated monomer and a polymerizable amine-containing unsaturated monomer. The second monomer component may comprise a plurality of polymerizable unsaturated monomers. The second monomer component may comprise a plurality of polymerizable amine-containing unsaturated monomers. The second monomer may comprise a plurality of polymerizable unsaturated monomer and a polymerizable amine-containing unsaturated monomer. The second monomer component may comprise a polymerizable unsaturated monomer and a plurality of polymerizable amine-containing unsaturated monomers. The second monomer component may comprise a plurality of polymerizable unsaturated monomers and a plurality of polymerizable amine-containing unsaturated monomers.

The second monomer component may comprise only one or more monomers. Additionally, the second monomer component may comprise additional additive. An example of such an additive includes a solvent, a diluent, a catalyst, an initiator, a hybridizing compound, a chain transfer agent, and a UV absorber.

The first monomer component or the second monomer component, or both, may comprise a solvent or a diluent. The solvent or the diluent for step (b) or (c) of the synthesis of the hybridized copolymer is a solvent which dissolves or disperses other materials in the first monomer component, such as a polymerizable unsaturated monomer or a polymerizable amine-containing unsaturated monomer. Any commonly used solvent or diluent is appropriate, as long as the reaction product of the reaction of the functionalized hydrophobic polymer with the hybridizing compound, the first monomer component, and the second monomer component are soluble or dispersible within the solvent and they do not react with the solvent. Suitable solvents or diluents for step (b) or (c) of the above reaction is an inert organic liquid. Examples of such a solvent includes mineral oil; straight and branched-chain hydrocarbons, such as pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; halogenated hydrocarbons such as dichloromethane, chloroform, carbon tetrachloride, perfluorinated $C_5$ to $C_{10}$ alkanes; chlorobenzenes; aromatic and alkylsubstituted aromatic compounds, such as benzene, toluene, mesitylene, and xylene; ethers, such as diethyl ether, tetrahydrofuran; ketones, such as acetone, methyl ethyl ketone; dimethyl sulfoxide; acetonitrile. In addition to the inert organic liquids, labile solvents may be used during the preparation of the hybridized copolymer, if added in an appropriate sequence. Care must be taken not to use such labile solvents that may interfere with the polymerization reaction of the side chains after the addition of the first and second monomer component.

The first monomer component or the second monomer component, or both components, may comprise a catalyst or an initiator. The catalyst or initiator added to the mixture in steps (b) or (c) of the preparation of the hybridized copolymer is any compound which helps with controlling or advancing the polymerization of the polymerizable unsaturated monomer or a polymerizable amine-containing unsaturated monomer or both, with the reaction product of the reaction of the functionalized hydrophobic polymer with the hybridizing compound, regardless if the polymerizable unsaturated monomer or a polymerizable amine-containing unsaturated monomer is added to the reaction mixture in step (b) or step (c) or any other step. Examples of such catalysts and initiators include metal catalysts, such as dibutyltin dilaurate, diisobutyryl peroxide, cumyl peroxyneodecanoate, di(3-methoxybutyl)peroxydecanoate, 1,1,3,3-tetramethylbutyl peroxyneodecanoate, cumyl peroxyneoheptanoate, tert-amyl peroxyneodecanoate, di-sec-buyl peroxydicarbonate, diisopropyl peroxydicarbonate, di(4-t-butylcyclohexyl)peroxydicarbonate, di(2-ethylhexyl)peroxydicarbonate, dibutyl peroxydicarbonate, tert-butyl-peroxyneodecanoate, dicetyl peroxydicarbonate, dimyristyl peroxydicarbonate, 1,1,3,3-tetramethylbutyl peroxypivalate, tert-butyl peroxyneoheptanoate, tert-amyl peroxypivalate, tert-butyl peroxypivalate, di(3,5,5-trimethylhexanoyl) peroxide, dilauroyl peroxide, didecanoyl peroxide, 2,2'-azodi(isobutyronitrile), 2,2'-azodi(2-methylbutonitrile), 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1'-azodi(hexahydrobenzonitrile), 1,1-ditert-butylperoxy)-3,3,5-trimethylcyclohexane, 1,1-di(tert-amylperoxy)cyclohexane, 1,1-di(tert-butylperoxy)cyclohexane, tert-amylperoxy-2-ethylhexyl carbonate, tert-amyl peroxyacetate, tert-butyl peroxu-3,5,5-trimethylhexanoate, 2,2-di(tert-butylperoxy)butane, tert-butylperoxy isopropyl carbonate, tert-butylperoxy-2-ethylhexylcarbonate, tert-amyl peroxybenzoate, tert-butyl peroxyacetate, butyl 4,4-di(tert-butylperoxy)valerate, tert-butyl peroxybenzoate, dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy) hex-3-yne, di-tert-butyl peroxide, 3,6,9-triethyl-3,6,9-trimethyl-1,4,7-triperoxonane, isopropylcumyl hydroperoxide, 1,1,3,3-tetramethylbutyl hydroperoxide, 3,3,5,7,7-pentamethyl-1,2,4-trioepane, cumyl hydroperoxide, tert-butyl hydroperoxide, tert-amyl hydroperoxide, and 2,3-dimethyl-2,3-diphenylbutane, tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

The polymerization may also be carried out in the presence of a conventionally known chain transfer agent, or a mixture of chain transfer agents. The chain transfer agent may be added to the reaction mixture with any of the monomer components, before the addition of a monomer component, or after a monomer component. Examples of chain transfer agents include mercaptans, such as octyl mercaptan, n-dodecyl mercaptan, t-dodecyl mercaptan, n-hexadecyl mercaptan, n-tetradecyl mercaptan, and t-tetradecyl mercaptan; xanthogen disulfides, such as dimethyl xanthogen disulfide, diethyl xanthogen disulfide, and diisopropyl xanthogen disulfide; thiuram disulfides, such as tetramethyl thiuram disulfide, tetraethyl thiuram disulfide, and tetrabutyl thiuram disulfide; halogenated hydrocarbons, such as carbon tetrachloride and ethylene bromide; selected hydrocarbons, such as pentaphenylethane, 1,1-diphenylethylene, and alpha-methylstyrene dimer; unsaturated heterocyclic compounds, such as xanthene, 2,5-dihydrofuran, 9,10-dihydroanthracene, 1,4-dihydronaphthalene, indene, and 1,4-cyclohexadiene; and other chain transfer agents such as acrolein, methacrolein, 2-ethylhexylthioglycolate, terpinolene, alpha-terpinene, gamma-terpinene, and dipentene. The preferred chain transfer agents are mercaptans. The amount of the chain transfer agent added is 0.2 to 7 parts by weight, more preferably 0.2 to 5 parts by weight, particularly preferably 0.3 to 3 parts by weight, based on 100 parts by weight in total of the polymerizable unsaturated monomer and polymerizable amine-containing unsaturated monomer.

The first monomer component or the second monomer component, or both components, may comprise a hybridizing compound. The hybridizing compound that may be has a formula $R^{h1}$—$B^1$—$B^2$—$B^3$—$R^{h2}$, wherein $R^{h1}$— is the first functional group on the hybridizing compound, —$R^{h2}$ is the second functional group on the hybridizing compound. The assembly —$B^1$—$B^2$—$B^3$— represents the divalent bridging group connecting the first functional group to the second functional group, wherein any of —B1-, —B2-, and —B3-, are each independently a bond, an alkyl bridging group, a cycloalkyl bridging group or an aryl bridging group. Each of these moieties is described more fully above. The hybridizing compound that is a part of the first monomer component or the second monomer component may the same or different than the hybridizing compound selected for use in step (a).

The first monomer component or the second monomer component, or both components, may comprise a UV absorber. Such a UV absorber may be added to the first monomer component or the second monomer component, or both components, to improve the physical or chemical properties of the hybridized copolymer, such as the stability of the ink. Such a UV absorber will dissipate the energy that is absorbed by the printed ink thus mitigating the aging process of the printed ink. Such a UV absorber will absorb the UV radiation and prevent the formation of free radicals. Examples of UV absorbers that may be incorporated into the side chains include benzophenones, hindered amine light stabilizers, benzotriazoles, nickel quenchers, 2-(2'-hydroxy-5'-methacryloyloxy ethylphenyl)-2-H-benzotriazole, Ruva 93, bis(1,2,2,6,6-pentamethyl-4-piperidinyl)sebacate and methyl(1,2,2,6,6-pentamethyl-4-piperidinyl)sebacate, and bis(2,2,6,6-tetramethyl-4-piperidyl) sebacate.

The reaction of the second monomer component with the hybridized copolymer intermediate results in the pre-neutralized hybrid copolymer. Although the neutralization step (d) may follow step (c) immediately, there may be one or more intermediate steps that follow step (c) and precede step (d). Such steps may include one or more additions of a polymerization initiator, a solvent, an antioxidant, a catalyst, or any mixture thereof. Such steps may also include partial evaporation of the solvent.

The reaction of the second monomer component with the hybridized copolymer intermediate results in the hybrid copolymer. In step (d), the hybrid copolymer is then neutralized with an acid.

The neutralization of the hybrid copolymer completes the formation of the hybrid copolymer. The hybrid copolymer may then be isolated or further used in the preparation of a liquid ink.

The acid which is used to neutralize the hybrid copolymer should strong enough to cause neutralization to occur, but it should not be strong enough to degrade the hybrid copolymer. The acid is a weak acid. Examples of suitable weak acid includes acetic acid, lactic acid, formic acid, propionic acid, and carbonic acid. In one embodiment the acid is a mixture of two or more acids.

Following step (d) of the synthesis of the hybridized copolymer of the present invention, additional steps may be needed to obtain the hybridized copolymer. Such steps may include an addition of a solvent, a diluent, a polymerization initiator, a catalyst, or any mixture thereof. Such steps may also include partial evaporation of the solvent.

In the preparation of the hybridized copolymer, either of the monomer components or both of the monomer components comprise a polymerizable unsaturated monomer. Under one embodiment of the present invention, the polymerizable unsaturated monomer is found within the first monomer component. Under another embodiment of the present invention, a plurality of the polymerizable unsaturated monomer is found within the first monomer component. Under another embodiment of the present invention, the polymerizable unsaturated monomer is found within the second monomer component. Under another embodiment of the present invention, a plurality of the polymerizable unsaturated monomer is found within the second monomer component. Under another embodiment of the present invention, the polymerizable unsaturated monomer is found within the first monomer component and within the second monomer component.

The polymerizable unsaturated monomer is selected from a group consisting of an acrylate monomer, an alkacrylate monomer, an aromatic vinyl monomer, an aliphatic vinyl monomer, a vinyl ester monomer, a vinyl cyanogen-containing monomer, a halogenoid monomer, an olefin monomer, a diene monomer, and a carboxylic acid-containing monomer. Although only one kind of a polymerizable unsaturated monomer may be used in preparation, under another embodiment a plurality of polymerizable unsaturated monomers may be used.

The polymerizable unsaturated monomer which is the basis of one type of repeating units within the side chain of hybrid copolymer has the formula

$$CH_2=C(R^2)—X—Y—R^1,\qquad\text{(Formula 1)}$$

wherein

—$R^2$ is H, halogen, or $C_1$ to $C_3$ alkyl group;

—X— is a bond, —CO—O—, or —O—CO—;

—Y— is a bond, or a $C_1$ to $C_{22}$ bridging alkyl group optionally substituted with one or more $C_1$ to $C_6$ alkyl groups; and —$R^1$ is (1) H, halogen, —OH, or —CN;

(2) a $C_3$ to $C_8$ cycloalkyl group that is optionally substituted with one or more linear or branched $C_1$ to $C_6$ alkyl group;

(3) a $C_3$ to $C_8$ heterocycloalkyl group comprising one or more heteroatoms, wherein the heteroatom is a chalcogen;

(4) a $C_7$ to $C_{15}$ bicycloalkyl group that is optionally substituted with one or more halogens, or linear or branched $C_1$ to $C_6$ alkanes;

(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;

(6) $SiR^3_3$, wherein $R^3$ is $C_1$ to $C_3$ alkyl group;

(7) polyethylene glycol, polypropylene glycol, or a copolymer thereof, terminated with —OH or —OMe;

(8) —CZ=$CH_2$, wherein Z is H or halogen; or (9) —CO=OH.

A halogen is an atom of the 17th Group of the period table, which includes fluorine, chlorine, bromine and iodine.

$C_1$ to $C_3$ alkyl group is a methyl group, ethyl group, n-propyl group, or a i-propyl group.

$C_1$ to $C_{22}$ bridging alkyl group is a saturated bridging group of formula —$(CH_2)_n$— wherein n is an integer 1 to 22. The term "alkyl" as used to refer to a bridging group, a divalent group, is referred under current IUPAC rules as "alkdiyl" group. This bridging group may be further substituted anywhere along the chain by a small terminal alkyl group such as methyl, ethyl, propyl, butyl, pentyl, hexyl, or an isomer any of the foregoing.

In cases when —X— is a bond, the formula $CH_2=C(R^2)$—X—Y—$R^1$, is reduced to formula $CH_2=C(R^2)$—Y—Y—$R^1$. Likewise, when —Y— is a bond, the formula $CH_2=C(R^2)$—X—Y—$R^1$, is reduced to formula $CH_2=C(R^2)$—Y—Y—$R^1$. Furthermore, when both —X— and —Y— are bonds, the formula $CH_2=C(R^2)$—X—Y—$R^1$, is reduced to $CH_2=C(R^2)$—$R^1$.

The symbol —CN refers to a cyanyl group. The cyanyl group should be chemically inert vis-à-vis conditions in which the copolymer may be exposed in order to avoid hydrolysis of the cyanyl group.

Under one embodiment of the present invention, the polymerizable unsaturated monomer which is the basis for the side chains is an acrylate monomer, an alkacrylate monomer, or both. The acrylate monomer is of formula $CH_2=C(R^2)$—X—Y—$R^1$, wherein
—$R^2$ is H;
—X— is —CO—O—;
—Y— is a bond, or a $C_1$ to $C_{22}$ bridging alkyl group optionally substituted with one or more $C_1$ to $C_6$ alkyl groups; and
—$R^1$ is
(1) H or —OH;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy; or
(6) polyethylene glycol, polypropylene glycol, or a copolymer thereof, terminated with —OH or —OMe.

The acrylate monomer is also of formula $CH_2=CH$—CO—O—Y—Y—$R^1$, wherein
—Y— is a bond, or a $C_1$ to $C_{22}$ bridging alkyl group optionally substituted with one or more $C_1$ to $C_6$ alkyl groups; and
—$R^1$ is
(1) H or —OH;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy; or
(6) polyethylene glycol, polypropylene glycol, or a copolymer thereof, terminated with —OH or —OMe.

Examples of suitable acrylate are 2-hydroxyethyl acrylate, HEA, ethyl acrylate, methyl acrylate, n-propyl acrylate, i-propyl acrylate, n-butyl acrylate, i-butyl acrylate, t-butyl acrylate, n-pentyl acrylate, n-amyl acrylate, i-pentyl acrylate, isoamyl acrylate, n-hexyl acrylate, cyclohexyl acrylate, 2-ethylhexyl acrylate, octyl acrylate, i-octyl acrylate, decyl acrylate, isodecyl acrylate, dodecyl acrylate, lauryl acrylate, octadecyl acrylate, isobornyl acrylate, phenyl acrylate, benzyl acrylate, ethylene glycol methyl ether acrylate, glycidyl acrylate, and mixtures thereof. Under one embodiment of the invention the acrylate monomers that are the basis of the copolymeric side chain is 2-hydroxylethyl acrylate, ethyl acrylate, or a mixture thereof.

The alkylacrylates monomer is of formula $CH_2=C(R^2)$—X—Y—$R^1$, wherein
—$R^2$ is $C_1$ to $C_3$ alkyl;
—X— is —CO—O—;
—Y— is a bond, or a $C_1$ to $C_{22}$ bridging alkyl group optionally substituted with one or more $C_1$ to $C_6$ alkyl groups; and
—$R^1$ is
(1) H;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3_3$, wherein $R^3$ is $C_1$ to $C_3$ alkyl group;
(7) polyethylene glycol, polypropylene glycol, or a copolymer thereof, terminated with OH or OMe; or
(8) —CZ=$CH_2$, wherein Z is H or halogen.

One example of an alkylacrylate monomer is a methacrylate. Methacrylate has a formula

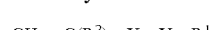
$CH_2=C(R^2)$—X—Y—$R^1$, wherein
—$R^2$ is $C_1$ alkyl;
—X— is —CO—O—;
—Y— is a bond, or a $C_1$ to $C_{22}$ bridging alkyl group optionally substituted with one or more $C_1$ to $C_6$ alkyl groups; and
—$R^1$ is
(1) H;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3_3$, wherein $R^3$ is $C_1$ to $C_3$ alkyl group;
(7) polyethylene glycol, polypropylene glycol, or a copolymer thereof, terminated with OH or OMe; or
(8) —CZ=$CH_2$, wherein Z is H or halogen.

$C_1$ alkyl is a methyl group.

Examples of suitable methacrylates include methyl methylacrylate, MMA, ethyl methacrylate, propyl methacrylate, isopropyl methacrylate, n-butyl methacrylate, i-butyl methacrylate, s-butyl methacrylate, t-butyl methacrylate, n-amyl methacrylate, isoamyl methacrylate, n-hexyl methacrylate, cyclohexyl methacrylate, 2-ethylhexyl methacrylate, octyl methacrylate, decyl methacrylate, dodecyl methacrylate, octadecyl methacrylate, behenyl methacrylate, lauryl methacrylate, isobornyl methacrylate (IBOMA), phenyl methacrylate, benzyl methacrylate, 1-naphthyl methacrylate, (trimethylsilyl)methacrylate, 9-anthracenylmethyl methacrylate, glycidyl methacrylate, polyethylene glycol monomethacrylate, polypropylene glycol monomethacrylate, and ethylene glycol propylene glycol monomethacrylate. Under one embodiment of the invention the methacrylate monomers that are the basis of the copolymeric side chain is methyl 2-methacrylate, behenyl methacrylate, or a mixture thereof.

The aromatic vinyl monomer is of formula $CH_2=C(R^2)-R^1$,
wherein
—$R^2$ is H or $C_1$ to $C_3$ alkyl group;
—$R^1$ is a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy.

Aryl groups are any hydrocarbon cyclic groups that follow the Hückel Rule. Such aryl groups may be single aromatic ring group, bicyclic aromatic ring group, or tricyclic aromatic ring group. An examples of a single aromatic ring group is the phenyl group. An example of a bicyclic aromatic ring group is naphthalene. An example of a tricyclic aromatic ring group is anthracene. Any of the aromatic groups may be optionally substituted with one or more of any of the following: fluorine, chlorine, bromine, iodine, methyl, ethyl, propyl, butyl, pentyl, hexyl, methoxy, ethoxy, propyloxy, including any isomers thereof.

Examples of suitable aromatic vinyl monomer include styrene, alpha-methylstyrene, vinyl toluene, 4-t-butylstyrene, chlorostyrene, vinylanisole, and vinyl naphthalene.

The vinyl ester monomer is of formula $$CH_2=CH-O-CO-Y-Y-R^1,$$

wherein
—Y— is a bond, or a $C_1$ to $C_{22}$ bridging alkyl group optionally substituted with one or more $C_1$ to $C_6$ alkyl groups; and
—$R^1$ is
(1) H, halide, —OH, or —CN;
(2) a $C_3$ to $C_8$ cycloalkyl group that is optionally substituted with one or more linear or branched $C_1$ to $C_6$ alkyl group;
(3) a $C_3$ to $C_8$ heterocycloalkyl group comprising one or more heteroatoms, wherein the heteroatom is a chalcogen;
(4) a $C_7$ to $C_{15}$ bicycloalkyl group that is optionally substituted with one or more halogens, or linear or branched $C_1$ to $C_6$ alkanes;
(5) a $C_6$ to $C_{14}$ aryl group that is optionally substituted with one or more groups selected from the group consisting of a halogen, a linear or branched $C_1$ to $C_6$ alkane, and $C_1$ to $C_3$ alkyloxy;
(6) $SiR^3_3$, wherein $R^3$ is $C_1$ to $C_3$ alkyl group;
(7) polyethylene glycol, polypropylene glycol, or a copolymer thereof, terminated with —OH or —OMe; or
(8) —CZ=$CH_2$, wherein Z is H or halogen.

An example of a suitable vinyl ester is vinyl acetate.

The vinyl cyanogen-containing monomer is an unsaturated monomer of Formula 1 that comprises a —CN group. Examples of cyanogen-containing monomer include acrylonitrile and methacrylonitrile.

The halogenoid monomer is an unsaturated monomer of Formula 1 that comprises one or more halogens. An examples of a halogen includes fluorine, chlorine, bromine and iodine. An example of a halogenoid comprising one halogen is vinyl chloride. An example of a halogenoid comprising two halogens is vinylidene chloride.

The olefin monomer is of formula $$CH_2=C(R^2)-Y-Y-R^1,$$

wherein
—$R^2$ is H, or $C_1$ to $C_3$ alkyl group;
—Y— is a bond, or a $C_1$ to $C_{22}$ bridging alkyl group optionally substituted with one or more $C_1$ to $C_6$ alkyl groups; and
—$R^1$ is H.

Examples of an olefin monomer include ethylene and propylene.

The diene monomer is of formula $$CH_2=CH-Y-R^1,$$

wherein
—Y— is a bond, or a $C_1$ to $C_{22}$ bridging alkyl group optionally substituted with one or more $C_1$ to $C_6$ alkyl groups; and
—$R^1$ is —CZ=$CH_2$, wherein Z is H or halogen.

An example of a diene monomer when Z=H is butadiene. An example of a diene monomer when Z is a halogen is chloroprene.

The polymerizable amine-containing unsaturated monomer which is the basis for one type of a building unit of the side chains is selected from a group consisting of an amine-containing acrylate, an amine-containing methacrylate, an acrylamide, a methacrylamide, and an amine-containing vinyl monomer. Although only one kind of a polymerizable unsaturated monomer may be used in preparation of any of the side chains, typically a several kinds of polymerizable unsaturated monomers are used.

The polymerizable amine-containing unsaturated monomer which is the basis of one type of repeating units within the side chain of hybrid copolymer has the formula $$CH_2=C(R^{n2})-X^n-Y^n-R^{n1}, \quad \text{(Formula 2)}$$

wherein
—$R^{n2}$ is H, halogen, or $C_1$ to $C_3$ alkyl group;
—$X^n$— is a bond, —CO—O—, —CO—NH—, —CO—, —O—, or —S—;
—$Y^n$— is a bond, or a $C_1$ to $C_{18}$ bridging alkyl group optionally substituted with one or more $C_1$ to $C_6$ alkyl groups; and
—$R^{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with —OH or —OMe; and wherein —X$^n$— or —R$^{n1}$ or both comprise nitrogen.

Pnicogen is an atom of the 15th Group of the periodic table, which includes nitrogen, phosphorus, arsenic and antimony.

Chalcogen is an atom of the 16th Group of the periodic table, which includes oxygen, sulfur, selenium, and tellurium.

Halogen is an atom of the 17th Group of the period table, which includes fluorine, chlorine, bromine and iodine.

$C_1$ to $C_3$ alkyl group is a methyl group, ethyl group, n-propyl group, or an i-propyl group.

$C_1$ to $C_{22}$ bridging alkyl group is a saturated bridging group of formula —(CH$_2$)$_n$— wherein n is an integer 1 to 22. The term "alkyl" as used to refer to a bridging group, a divalent group, is referred under current IUPAC rules as "alkdiyl" group. This bridging group may be further substituted anywhere along the chain by a small terminal alkyl group such as methyl, ethyl, propyl, butyl, pentyl, hexyl, or an isomer any of the foregoing.

In cases when —X$^n$— is a bond, the formula CH$_2$=C(R$^{n2}$)—X$^n$—Y$^n$—R$^{n1}$, is reduced to formula CH$_2$=C(R$^{n2}$)—Y$^n$—R$^{n1}$. Likewise, when —Y$^n$— is a bond, the formula CH$_2$=C(R$^{n2}$)—X$^n$—Y$^n$—R$^{n1}$, is reduced to formula CH$_2$=C(R$^{n2}$)—Y$^n$—R$^{n1}$. Furthermore, when both —X$^n$— and —Y$^n$— are bonds, the formula CH$_2$=C(R$^{n2}$)—X$^n$—Y$^n$—R$^{n1}$, is reduced to CH$_2$=C(R$^{n2}$)—R$^{n1}$.

The definition of amine containing unsaturated monomer also includes adducts of such monomers, such as salts; quaternary amine salts, such as halides; and hydrates.

Under one embodiment of the present invention, the polymerizable amine-containing unsaturated monomer which is the basis for the side chains is an amine-containing acrylate monomer. The amine-containing acrylate monomer is of formula CH$_2$=CH—CO—O—Y$^n$—R$^{n1}$ wherein
—Y$^n$— is a bond, or a $C_1$ to $C_{18}$ bridging alkyl group optionally substituted with one or more $C_1$ to $C_6$ alkyl groups; and
—R$^{n1}$ is
(1) NR$^{n3}$R$^{n4}$, wherein R$^{n3}$ and R$^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; or
(4) a $C_6$ to $C_{14}$ aryl group further substituted with an amine-containing group.

When the polymerizable amine-containing unsaturated monomer which is the basis for the side chains is an amine-containing acrylate monomer of formula CH$_2$=CH—CO—O—Y$^n$—R$^{n1}$, then moiety —R$^{n1}$ comprises nitrogen.

Examples of suitable polymerizable amine-containing acrylate includes t-butylaminoethyl acrylate, dimethylaminomethyl acrylate, diethylaminoethyl acrylate, oxazolidinyl ethyl acrylate, aminoethyl acrylate, 4-(beta-acryloxyethyl)-pyridine, and 2-(4-pyridyl)-ethyl acrylate.

Under another embodiment of the present invention, the polymerizable amine-containing unsaturated monomer which is the basis for the side chains is an amine-containing methacrylate monomer. The amine-containing methacrylate monomer is of formula CH$_2$=C(CH$_3$)—CO—O—Y$^n$—R$^{n1}$, wherein
—Y$^n$— is a bond, or a $C_1$ to $C_{18}$ bridging alkyl group optionally substituted with one or more $C_1$ to $C_6$ alkyl groups; and
—R$^{n1}$ is
(1) NR$^{n3}$R$^{n4}$, wherein R$^{n3}$ and R$^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; or
(4) a $C_6$ to $C_{14}$ aryl group further substituted with an amine-containing group.

When the polymerizable amine-containing unsaturated monomer which is the basis for the side chains is an amine-containing acrylate monomer of formula CH$_2$=C(CH$_3$)—CO—O—Y$^n$—R$^{n1}$, then moiety —R$^{n1}$ comprises nitrogen.

Examples of suitable polymerizable amine-containing methacrylate include 2-aminoethyl methacrylate, t-butylaminoethyl methacrylate, 2-(diethylamino)ethyl methacrylate, dimethylaminomethyl methacrylate, diethylaminoethyl methacrylate, 2-dimethylaminoethyl methacrylate, DMAEMA, oxazolidinyl ethylmethacrylate, aminoethyl methacrylate, diethylaminohexyl methacrylate, 3-dimethylamino-2,2-dimethyl-propyl methacrylate, methacrylate of N-hydroxyethyl-2,4,4-trimethylpyrrolidine, 1-dimethylamino-2-propyl methacrylate, beta-morpholinoethyl methacrylate, 3-(4-pyridyl)-propyl methacrylate, 1-(4-pyridyl)-ethyl methacrylate, 1-(2-methacryloyloxyethyl)-2-imidazolidinone, Norsocryl 102, 3-(beta-methacryloxyethyl)-pyridine, 3-methacryloxypyridine and oxazolidinyl ethyl methacrylate.

Under one embodiment of the present invention the amine-containing methacrylate is selected from the group consisting of t-butylaminoethyl methacrylate, 2-dimethylaminoethyl methacrylate, DMAEMA, and 1-(2-methacryloyloxyethyl)-2-imidazolidinone.

The acrylimide is of formula

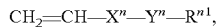
$CH_2=CH-X^n-Y^n-R^{n1}$, wherein
—$X^n$— is —CO—NH—, or —CO—;
—$Y^n$— is a bond, or a $C_1$ to $C_{18}$ bridging alkyl group optionally substituted with one or more $C_1$ to $C_6$ alkyl groups; and
—$R^{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with —OH or —OMe; and
provided that when —$X^n$— is —CO—, then —X— is a bond and —$R^{n1}$ is (2).

Acrylamide that is a suitable polymerizable amine-containing unsaturated monomer which is the basis for the side chain of the copolymer of the present invention has a nitrogen as a part of the acrylimide group $CH_2=CH-CO-NH-$ or $CH_2=CH-CO-NR^{n3}R^{n4}$. Further, in addition to the nitrogen which is a part of the acrylamide group, acrylamide that is a suitable polymerizable amine-containing unsaturated monomer may have one or more additional nitrogen atoms on the $R^{n1}$ group, making each repeating unit have at least two nitrogens.

Examples of suitable acrylamides include N,N-dimethylacrylamide, NNDMA, N-acryloylamido-ethoxyethanol, N-t-butylacrylamide, N-diphenylmethyl acrylamide, and N-(beta-dimethylamino)ethyl acrylamide. Of these acrylkamides, N,N-dimethylacrylamide, NNDMA, and N-(beta-dimethylamino)ethyl acrylamide have two nitrogen atoms.

Under one embodiment of the invention the acrylamide is N,N-dimethylacrylamide, or NNDMA.

A methacrylamide is of formula

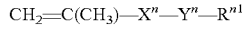
$CH_2=C(CH_3)-X^n-Y^n-R^{n1}$ wherein
—$X^n$— is —CO—NH—, or —CO—;
—$Y^n$— is a bond, or a $C_1$ to $C_{18}$ bridging alkyl group optionally substituted with one or more $C_1$ to $C_6$ alkyl groups; and
—$R^{n1}$ is
(1) H;
(2) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(3) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(4) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group;
(5) a $C_6$ to $C_{14}$ aryl group further substituted with an amine-containing group;
(6) a $C_1$ to $C_8$ alkyl group substituted with a plurality of aryl groups; or
(7) polyethylene glycol, polypropylene glycol, or a copolymer thereof, terminated with —OH or —OMe; and
provided that when —$X^n$— is —CO—, then —X— is a bond and —$R^{n1}$ is (2).

Methacrylamide that is a suitable polymerizable amine-containing unsaturated monomer which is the basis for the side chain of the copolymer of the present invention has a nitrogen as a part of the methacrylimide group $CH_2=C(CH_3)-CO-NH-$ or $CH_2=C(CH_3)-CO-NR^{n3}R^{n4}$. Further, in addition to the nitrogen which is a part of the acrylamide group, acrylamide that is a suitable polymerizable amine-containing unsaturated monomer may have one or more additional nitrogen atoms on the $R^{n1}$ group, making each repeating unit have at least two nitrogens.

Examples of suitable methacrylamides include N-(3-dimethylaminopropyl) methacrylamide and N-(beta-dimethylamino)ethyl methacrylamide. Both of these exemplary compounds contain two nitrogen atoms.

An amine-containing vinyl monomer is of formula

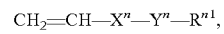
$CH_2=CH-X^n-Y^n-R^{n1}$, wherein
—$X^n$— is a bond, —O—, or —S—;
—$Y^n$— is a bond, or a $C_1$ to $C_{18}$ bridging alkyl group optionally substituted with one or more $C_1$ to $C_6$ alkyl groups; and
—$R^{n1}$ is
(1) $NR^{n3}R^{n4}$, wherein $R^{n3}$ and $R^{n4}$ are each independently selected from the group consisting of H, a $C_1$ to $C_{12}$ linear or branched alkyl group, a $C_1$ to $C_{12}$ linear or branched alkylene group, a $C_3$ to $C_8$ cycloalkyl group, and $C_1$ to $C_{12}$ linear or branched alkyl group substituted with one or more hydroxyl groups;
(2) a $C_3$ to $C_8$ heterocycloalkyl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_{12}$ alkane, halogen, $C_1$ to $C_3$ alkoxy group, and an oxo group;
(3) a $C_6$ to $C_{14}$ heteroaryl group comprising a nitrogen atom, optionally further comprising one or more heteroatoms, wherein the heteroatom is a pnicogen or a chalcogen, optionally further substituted with one or more groups selected from the group consisting of a linear or branched $C_1$ to $C_6$ alkane, halogen, $C_1$ to $C_3$ alkyl ether, and an oxo group; and (4) a $C_6$ to $C_{14}$ aryl group further substituted with an amine-containing group.

The performance characteristics of the hybridized copolymer of the present invention is in large part determined by the chemical and physical characteristics of the hydrophobic functional polymeric backbone and of the copolymeric side chains attached to the backbone, as well as the ratios of the polymeric units comprising the hybridized copolymer. There are several that appear to be important in order to obtain an ink that would have the desirable characteristics, including the following: (1) the molar ratio of polymerizable amine-containing unsaturated monomer to the functionality of the functionalized hydrophobic polymer; (2) the molar ratio of polymerizable unsaturated monomer to the polymerizable amine-containing unsaturated monomer; and (3) the molar ratio of the polymerizable amine-containing unsaturated monomer in the first monomer component to the polymerizable amine-containing unsaturated monomer in the second monomer component.

The molar ratio of polymerizable amine-containing unsaturated monomer to the functionality of the functionalized hydrophobic polymer, is the ratio of the total number of moles of the amine-containing unsaturated monomer that is added to the reaction mixture in both monomer components, to the number of moles of functionality on the functionalized hydrophobic polymer. The number of moles of the functionality is the number of moles of the functionalized hydrophobic polymer multiplied by the functionality of the functionalized hydrophobic polymer. It has been found that many different ratios may yield acceptable results, however, it is unexpected and surprising that the hybridized copolymer exhibits improved properties when the molar ratio of polymerizable amine-containing unsaturated monomer to the functionality of the functionalized hydrophobic polymer is between 3:1 and 12:1.

The molar ratio of the polymerizable unsaturated monomer to the polymerizable amine-containing unsaturated monomer, is the ratio of the total number of moles of the polymerizable unsaturated monomer that is added to the reaction mixture in both monomer components, to the total number of moles the polymerizable amine-containing unsaturated monomer that is added to the reaction mixture in both monomer components. For these calculations the number of moles of polymerizable unsaturated monomer from all sources are added together, and compared to the number of moles of polymerizable amine-containing unsaturated monomer added together from all sources. It has been found that various ratios may yield acceptable results, however, it is unexpected and surprising that the hybridized copolymer exhibits improved properties when the molar ratio of the polymerizable unsaturated monomer to the polymerizable amine-containing unsaturated monomer is between 1:3 and 4:1.

The molar ratio of the polymerizable amine-containing unsaturated monomer in the first monomer component to the polymerizable amine-containing unsaturated monomer in the second monomer component, is the ratio of the number of moles of the polymerizable amine-containing unsaturated monomer that is added to the reaction mixture in the first monomer components, to the number of moles the polymerizable amine-containing unsaturated monomer that is added to the reaction mixture in the second monomer components. It has been found that various ratios may yield acceptable results, however, it is unexpected and surprising that the hybridized copolymer exhibits improved properties when the molar ratio of the polymerizable amine-containing unsaturated monomer in the first monomer component to the polymerizable amine-containing unsaturated monomer in the second monomer component is between 1:1 and 1:3.

The copolymeric side chains that are attached to the hydrophobic functional polymeric backbone may optionally comprise additional components. Such components may be added within the structure of side chains, and may be used to improve the physical or chemical properties of the hybridized copolymer, such as the stability of the ink. One such component is a structural unit that acts as a UV absorber. Such a UV absorber will dissipate the energy that is absorbed by the printed ink thus mitigating the aging process of the printed ink. Examples of UV absorbers that may be incorporated into the side chains include Ruva 93.

Another aspect of the present invention is the process for preparing the hybridized copolymer by a two part synthesis process.

In the two part synthesis process for preparing the hybridized copolymer, the process comprises the steps of (a) reacting a functionalized hydrophobic polymer of an average molecular weight ($M_N$) from about 15,000 to about 200,000, with a hybridizing compound to create a reaction mixture;

(b) adding a monomer component to the reaction mixture; and (c) neutralizing the reaction mixture with an acid;

wherein the hydrophobic polymer is selected from the group consisting of a polysiloxane polymer, a polyolefin polymer, and a polyvinyl polymer or a copolymer thereof; and wherein the monomer component comprises a polymerizable unsaturated monomer and a polymerizable amine-containing unsaturated monomer.

This preparation for the hybridized copolymer may add one or more additional steps before steps (a), (b), and (c). The preparation for the hybridized copolymer may add one or more additional steps after steps (a), (b), and (c). The preparation for the hybridized copolymer may add one or more additional steps between any of the steps (a), (b), and (c). Such additional steps may include adding further reactants, adding a third or fourth or additional monomer components to the reaction mixture, changing the reaction conditions, working up the reaction mixture, purifying any of reactants or Further, any of the individual steps (a), (b), and (c) may comprise additional necessary components or sub-steps in order to prepare the hybridized copolymer. For example, in addition to the two components mentioned in step (a), namely the functionalized hydrophobic polymer and the hybridizing compound, this step typically also requires additional components such as a solvent and a catalyst.

In step (a) of the two part synthesis of the hybridized copolymer, the functionalized hydrophobic polymer is reacted with the hybridizing compound. This step is similar to step (a) of the three part synthesis of the hybridized copolymer. The definition of the functionalized hydrophobic polymer used in the two part synthesis is the same as for the three part synthesis. The definition of the hybridizing compound used in the two part synthesis is the same as for the three part synthesis. The definition of molar ratios of the components used in the two part synthesis is the same as for the three part synthesis. The definition of optional additives for inclusion in part (a) is the same as for the three part synthesis.

Although the definitions of the functionalized hydrophobic polymer, hybridizing compound, molar ratios, and optional additives for step (a) in the two part synthesis is the same in step (a) in the three part synthesis, the functionalized hydrophobic polymer, hybridizing compound, molar ratios, and optional additives used in step (a) in the two part synthesis are not the same as in step (a) of the three part synthesis. For example, in order to achieve a working solution the loading level of the polymerization initiator may be higher than in the corresponding three part synthesis, because there is no step in the two part synthesis which would correspond to an intermediate step between step (b) and step (c) of the three part synthesis.

The reaction of the functionalized hydrophobic polymer with a hybridizing compound results a reaction mixture, which can then be reacted further. Step (b) follows step (a), either immediately, after some intermediate steps that follow step (a) and precede step (b).

In step (b), the monomer component is added to the reaction mixture. Upon addition of the monomer component, the monomers comprising the monomer component react with the reaction product of functionalized hydrophobic polymer and hybridizing compound, to create a pre-neutralized hybrid copolymer. The monomer component upon exposure to the reaction mixture polymerizes with the alkene groups on the functionalized hydrophobic polymer that has been reacted with the hybridizing compound, wherein the alkene corresponds to the first functional group on the hybridizing compound.

The molar ratio of the monomers of the monomer component to the alkene groups on the functionalized hydrophobic polymer determines the length of the copolymeric side chains on the hybridized copolymer. For example, for a molar ratio of 10:1, the average length of the side chain on the hybridized copolymer will be 10 units.

The monomer component comprises at least one polymerizable unsaturated monomer and at least one polymerizable amine-containing unsaturated monomer. The monomer component may comprise the polymerizable unsaturated monomer and the polymerizable amine-containing unsaturated monomer. The monomer component may comprise a plurality of polymerizable unsaturated monomers and the polymerizable amine-containing unsaturated monomers. The monomer component may comprise the polymerizable unsaturated monomer and a plurality of polymerizable amine-containing unsaturated monomers. The monomer may comprise a plurality of polymerizable unsaturated monomer and a plurality of polymerizable amine-containing unsaturated monomers.

The definitions of the polymerizable unsaturated monomer and the polymerizable amine-containing unsaturated monomer for two part synthesis are the same as for the three part synthesis, as presented above.

Additionally, the monomer component may comprise additional additive. An example of such an additive includes a solvent, a diluent, a catalyst, an initiator, a hybridizing compound, and a UV absorber. The definition of possible solvents, catalysts, initiators, hybridizing compounds, and UV absorbers is the same as for step (b) or step (c) in the three part synthesis.

The reaction of the monomer component with the reaction product of the functionalized hydrophobic polymer and hybridizing compound results in the hybrid copolymer. In step (c), the hybrid copolymer is neutralized with an acid.

The neutralization of the hybrid copolymer completes the formation of the hybrid copolymer. The hybrid copolymer may then be precipitated, or washed, or isolated, or further used in the preparation of a liquid ink.

The acid which is used to neutralize the hybrid copolymer should strong enough to cause neutralization to occur, but it should not be strong enough to degrade the pre-neutralized hybrid copolymer. The acid is a weak acid. Examples of suitable weak acid includes acetic acid, lactic acid, formic acid, propionic acid, and carbonic acid. In one embodiment the acid is a mixture of two or more acids.

Following step (c) of the synthesis of the hybridized copolymer of the present invention by the two part synthesis, additional steps may be needed to obtain the hybridized copolymer. Such steps may include an addition of a solvent, a diluent, a polymerization initiator, a catalyst, or any mixture thereof. Such steps may also include partial evaporation of the solvent.

Another aspect of the present invention is the process for preparing the hybridized copolymer by a one part synthesis process.

In the one part synthesis process for preparing the hybridized copolymer, the process comprises the steps of
(a) mixing a functionalized hydrophobic polymer of an average molecular weight of from about 15,000 to about 200,000 g/mole, a hybridizing compound, a polymerizable unsaturated monomer, and a polymerizable amine-containing unsaturated monomer to create a reaction mixture;
(b) increasing the temperature of the reaction mixture to cause a polymerization reaction to occur within the reaction mixture; and
(c) neutralizing the reaction mixture with an acid;
wherein the hydrophobic polymer is selected from the group consisting of a polysiloxane polymer, a polyolefin polymer, and a polyvinyl polymer, or a combination thereof.

This preparation for the hybridized copolymer may add one or more additional steps before steps (a), (b), and (c). The preparation for the hybridized copolymer may add one or more additional steps after steps (a), (b), and (c). The preparation for the hybridized copolymer may add one or more additional steps between any of the steps (a), (b), and (c). Such additional steps may include adding further reactants, adding additional monomer components to the reaction mixture, changing the reaction conditions, working up the reaction mixture, and purifying any of reactants.

Further, any of the individual steps (a), (b), and (c) may comprise additional necessary components or sub-steps in order to prepare the hybridized copolymer. For example, in addition to the four components mentioned in step (a), namely the functionalized hydrophobic polymer, the hybridizing compound, the polymerizable unsaturated monomer, and the polymerizable amine-containing unsaturated monomer, this step typically also requires additional components such as a solvent and a catalyst.

In step (a) of the one part synthesis of the hybridized copolymer, the functionalized hydrophobic polymer is mixed with the hybridizing compound, as well as with the polymerizable unsaturated monomer, and the polymerizable amine-containing unsaturated monomer. The definition of the functionalized hydrophobic polymer used in the one part synthesis is the same as for the three part synthesis. The definition of the hybridizing compound used in the one part synthesis is the same as for the three part synthesis. The definition of molar ratios of the components used in the one part synthesis is the same as for the three part synthesis. The definition of the polymerizable unsaturated monomer in the one part synthesis is the same as for the three part synthesis. The definition of the polymerizable amine-containing unsaturated monomer in the one part synthesis is the same as for the three part synthesis. The definition of optional additives for inclusion in part (a) is the same as for additives in parts (a), (b), and (c) in the three part synthesis.

Although the definitions of the functionalized hydrophobic polymer, hybridizing compound, molar ratios, polymerizable unsaturated monomer, polymerizable amine-containing unsaturated monomer and optional additives for step (a) in the one part synthesis is the same as in steps (a), (b) and (c) in the three part synthesis, the functionalized hydrophobic polymer, hybridizing compound, molar ratios, polymerizable unsaturated monomer, polymerizable amine-containing unsaturated monomer, and optional additives used in step (a) in the one part synthesis may not necessarily be the same as in steps (a), (b) and (c) of the three part synthesis. For example, in order to achieve a working solution the loading level of the polymerization initiator may be higher than in the corresponding three part synthesis, because there is no step in the two part synthesis which would correspond to an intermediate step between step (b) and step (c) of the three part synthesis.

In order for the functionalized hydrophobic polymer, the hybridizing compound to react, and further, in order for the polymerizable unsaturated monomer, and polymerizable amine-containing unsaturated monomer to polymerize with the reaction product of the functionalized hydrophobic polymer and the hybridizing compound, a sufficient energy must be delivered to the reaction mixture in order to traverse the activation energies of reactions. The energy may be delivered by heating, radiation, shear mixing, or sonication.

Alternatively, the activation energies of the various reactions may be lowered by a serial addition of appropriate initiators and catalysts. For example, the mixture of the functionalized hydrophobic polymer, the hybridizing compound, the polymerizable unsaturated monomer, and polymerizable amine-containing unsaturated monomer, and optionally any additives, may be exposed to a catalyst, followed by an addition of an initiator. The catalyst may cause the functionalized hydrophobic polymer to react with the hybridizing compound; the later addition of an initiator may cause the polymerization of the monomers with the reaction product of the functionalized hydrophobic polymer and the hybridizing compound.

Under another embodiment the reaction of the functionalized hydrophobic polymer with the hybridizing compound may be caused by a low to moderate heating of the reaction mixture, followed by moderate to high heating of the reaction mixture to cause polymerization of the polymerizable unsaturated monomers, and polymerizable amine-containing unsaturated monomers with the backbone.

Under another embodiment the reaction of the functionalized hydrophobic polymer with the hybridizing compound may be caused by a low to moderate heating of the reaction mixture, followed by an addition of an initiator to cause polymerization of the polymerizable unsaturated monomers, and polymerizable amine-containing unsaturated monomers with the backbone.

Under another embodiment the reaction of the functionalized hydrophobic polymer with the hybridizing compound may be caused by an addition of a catalyst to the reaction mixture, followed by an addition of an initiator to cause polymerization of the polymerizable unsaturated monomers, and polymerizable amine-containing unsaturated monomers with the backbone.

Under another embodiment the reaction of the functionalized hydrophobic polymer with the hybridizing compound may be caused by an addition of a catalyst to the reaction mixture, followed by heating of the reaction mixture to cause polymerization of the polymerizable unsaturated monomers, and polymerizable amine-containing unsaturated monomers with the backbone.

Although administering energy to the reaction mixture is needed in order to overcome the activation barrier, it is necessary to manage the temperature of the reaction mixture. Because the polymerization reaction is generally an exothermic process, the management of the temperature of the reaction mixture includes cooling of the reaction mixture. The cooling helps in obviating evaporation of the solvent, and in advancing the reaction.

The reaction of the polymerizable unsaturated monomer and the polymerizable amine-containing unsaturated monomer with the reaction product of the functionalized hydrophobic polymer and hybridizing compound results in the hybrid copolymer. In step (c) of the one part synthesis, the hybrid copolymer is neutralized with an acid.

The neutralization of the hybrid copolymer completes the formation of the hybrid copolymer. The hybrid copolymer may then be precipitated, or washed, or isolated, or further used in the preparation of a liquid ink.

The acid which is used to neutralize the pre-neutralized hybrid copolymer should strong enough to cause neutralization to occur, but it should not be strong enough to degrade the pre-neutralized hybrid copolymer. The acid is a weak acid. Examples of suitable weak acid includes acetic acid, lactic acid, formic acid, propionic acid, and carbonic acid. In one embodiment the acid is a mixture of two or more acids.

Following step (c) of the synthesis of the hybridized copolymer of the present invention by the two part synthesis, additional steps may be needed to obtain the hybridized copolymer. Such steps may include an addition of a solvent, a diluent, a polymerization initiator, a catalyst, or any mixture thereof. Such steps may also include partial evaporation of the solvent.

EXAMPLES

The following are several examples that illustrate several aspects of the invention.

The preparative and analytical techniques were undertaken using common laboratory techniques or techniques which have been adapted to suit the purpose.

Testing for solids in several of the following examples was performed by the following procedure. Approximately 300 mg sample of the material to be tested is weighed and spread evenly on an aluminum weighing boat with an optional aid of a solvent. The sample is air dried in about 10 minutes, placed into a 150° C. oven for 30 minutes, cooled to room temperature, and weighed. The percent solid of the material is the ratio of the dried sample weight to the initial sample weight. Completeness of evaporation of the solvents is assured by placing the dried sample into the oven for additional 30 minutes, cooling and reweighing. Each material is tested in triplicate.

Example 1

A mixture of 150 g of methyl ethyl ketone, 25.0 g of poly(vinyl chloride-co-vinyl acetate-co-vinyl alcohol) terpolymer (available as UMOH from Wuxi Honghui Chemical Co., Ltd.), 1.0 g of 3-isopropenyl-$\alpha,\alpha$-dimethylbenzyl isocyanate (available from Cytec Industries), and 50 mg of dibutyltin dilaurate (available as DABCO® T-12 from Air Products and Chemicals, Inc.) was charged to a 1 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 1.0 g benzoyl peroxide and 2.0 g 2,2'-azodi (isobutyronitrile) (available as Perkadox® AMBN-gr from Akzo Nobel Polymer Chemicals LLC) in 50 g of methyl ethyl ketone. A first monomer mixture, consisting of 2.0 g of 3-isopropenyl-α,α-dimethylbenzyl isocyanate and 15.0 g of dimethylaminoethyl methacrylate (available from BASF), was added simultaneously with 30% of the initiator component to the reaction flask over a period of 15 minutes.

After stirring for 5 minutes, a second monomer mixture, consisting of 5.0 g of hydroxyethylacrylate, 25.0 g of methyl methacrylate, and 20.0 g of 2-dimethylaminoethyl methacrylate, was added simultaneously with the balance of the initiator component to the reaction flask over a period of 20 minutes.

After stirring for one hour, a mixture of 0.5 g of benzoyl peroxide and 0.5 g of 2,2'-azodi(isobutyronitrile) dissolved in 20 g of isopropyl alcohol and 10 g of methyl ethyl ketone, were added over 10 minutes.

After another one hour hold time, the reaction mixture was sampled, and the conversion was found to be too low and the viscosity too high. The mixture was held at 75° C. for additional 2 hours after which the mixture gelled.

Example 2

A mixture of 750 g of methyl ethyl ketone, 125 g of poly(vinyl chloride-co-vinyl acetate-co-vinyl alcohol) terpolymer (available as UMOH from Wuxi Honghui Chemical Co., Ltd.), 5.0 g of 3-isopropenyl-α,α-dimethylbenzyl isocyanate (available from Cytec Industries), and 250 mg of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 5.0 g benzoyl peroxide and 10.0 g 2,2'-azodi (isobutyronitrile) (available as Perkadox® AMBN-gr from Akzo Nobel Polymer Chemicals LLC) in 250 g of methyl ethyl ketone. A first monomer mixture, consisting of 10.0 g of 3-isopropenyl-α,α-dimethylbenzyl isocyanate and 75.0 g of dimethylaminoethyl methacrylate (available from BASF), was added simultaneously with 30% of the initiator component to the reaction flask over a period of 20 minutes.

After 10 minutes of hold time, a second monomer mixture, consisting of 25.0 g of hydroxyethylacrylate, 125 g of methylmethacrylate, and 100 g of 2-dimethylaminoethyl methacrylate, was added simultaneously with the balance of the initiator component to the reaction flask over a period of 20 minutes.

After one additional hour of hold time, a mixture of 2.5 g of benzoyl peroxide and 2.5 g of 2,2'-azodi(isobutyronitrile) in 100 g of isopropyl alcohol and 50 g of methyl ethyl ketone, were added over 10 minutes.

After one hour of hold time, 0.5 g of 2,2'-azodi(isobutyronitrile) was added. An hour later, another 0.5 g of 2,2'-azodi(isobutyronitrile) was added.

The reaction mixture was left to sit for another hour, after which it was shown that the conversion was found to be 100% complete. The mixture was cooled to 65° C., and a solution of 35 g acetic acid and 5 g lactic acid in 750 g of deionized water was added to the polymer mixture over 10 minutes. A dean stark trap attached to the reaction flask setup, and the solvent was distilled. When the temperature of the reaction mixture reached 90° C., the heating was ceased. Upon cooling to 60° C., the mixture contained minimal amount of solvent, was filtered through cheese cloth and the resulting product recovered.

The resulting hybridized copolymer's physical properties measured: solids 35.1%; viscosity: 200 centipoises; pH: 6.5; and density: 1.1 g/mL.

A modified ASTM method D3359 was used to determine the adhesion of the residue on a substrate. A sample of the formed hybridized copolymer was dispersed in water in a 1:9 ratio. The dispersion was applied to a vinyl substrate by a No. 3 Meyer drawdown bar. After drying of the residue, an adhesive tape was applied over the residue. Upon removal of the tape from the substrate, it was found that all of the residue remained on the substrate, and no residue was found on the tape, which indicated excellent adhesion.

Another sample of the formed hybridized copolymer was dispersed in water in a 1:9 ratio. The dispersion was applied to a vinyl substrate by a No. 3 Meyer drawdown bar. After drying of the residue, the sample was analyzed via differential scanning calorimetry (DSC) and thermogravimetric analysis. In the DSC analysis, the reversible heat flow shows that the glass transition temperature ($T_g$) is at 46.7° C., which was close to the theoretical value. A large peak around 190° C. indicates a combination of a melting process and an irreversible degradation of the polymer. Above 190° C., the polymer color turns from clear amber to an opaque black with a yellow-orange undertone.

Example 3

A mixture of 250 g of methyl ethyl ketone, 61.7 g of poly(vinyl chloride-co-vinyl acetate-co-vinyl alcohol) terpolymer (available as UMOH from Wuxi Honghui Chemical Co., Ltd.), 1.6 g of 3-isopropenyl-α,α-dimethylbenzyl isocyanate (available from Cytec Industries), and 60 mg of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 1.6 g benzoyl peroxide and 3.3 g 2,2'-azodi (isobutyronitrile) (available as Perkadox® AMBN-gr from Akzo Nobel Polymer Chemicals LLC) in 84 g of methyl ethyl ketone. A first monomer mixture, consisting of 6.3 g of 3-isopropenyl-α,α-dimethylbenzyl isocyanate and 15.0 g of dimethylaminoethyl methacrylate (available from BASF), was added simultaneously with 30% of the initiator component to the reaction flask over a period of 15 minutes.

After 5 minutes of hold time, a second monomer mixture, consisting of 8.3 g of hydroxyethylacrylate, 41.7 g of methylmethacrylate, and 20 g of 2-dimethylaminoethyl methacrylate, was added simultaneously with the balance of the initiator component to the reaction flask over a period of 20 minutes.

After one additional hour of hold time, a mixture of 0.84 g of benzoyl peroxide and 0.84 g of 2,2'-azodi(isobutyronitrile) in 33.3 g of isopropyl alcohol and 16.7 g of methyl ethyl ketone, were added over 10 minutes.

After one hour hold time, about 100 g of methyl ethyl ketone was added to the reaction mixture in an attempt to mitigate the rising viscosity. Despite addition of another 100 g of methyl ethyl ketone, the reaction mixture gelled.

Example 4

A mixture of 200 g of methyl ethyl ketone, 35.0 g of poly(vinyl chloride-co-vinyl acetate-co-vinyl alcohol) terpolymer (available as UMOH from Wuxi Honghui Chemical Co., Ltd.), 3.0 g of 3-isopropenyl-α,α-dimethylbenzyl isocyanate (available from Cytec Industries), and 50 mg of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 4.0 g 2,2'-azodi(isobutyronitrile) (available as Perkadox® AMBN-gr from Akzo Nobel Polymer Chemicals LLC) in 50 g of methyl ethyl ketone. A first monomer mixture, consisting of 2.0 g of 3-isopropenyl-α,α-dimethylbenzyl isocyanate and 15.0 g of dimethylaminoethyl methacrylate (available from BASF), was added simultaneously with 30% of the initiator component to the reaction flask over a period of 15 minutes.

After 10 minutes of hold time, a second monomer mixture, consisting of 5.0 g of hydroxyethylacrylate, 5.0 g of methylmethacrylate, 25.0 g of Norsocryl® 102 (75% methyl methacrylate and 25% 2-ethyl (2-oxoimidazolidin-1-yl) methacrylate, available from Arkema Inc.), and 15.0 g of 2-dimethylaminoethyl methacrylate, was added simultaneously with the balance of the initiator component to the reaction flask over a period of 20 minutes.

After one hour of hold time, 0.5 g of 2,2'-azodi(isobutyronitrile) and 0.5 g of benzoyl peroxide were added. After another hour, additional 0.5 g of 2,2'-azodi(isobutyronitrile) and 0.5 g of benzoyl peroxide were added. The reaction mixture was cooled to room temperature overnight.

The following day, the reaction mixture was heated to reflux temperatures. 30 g of isopropyl alcohol was added and held for full conversion. When the polymerization was completed, the reaction mixture was cooled to 65° C. A solution of 200 g of deionized water, 8.0 g of acetic acid and 1 g of lactic acid was added to the reaction mixture over 10 minutes. Finally, a 0.5 g of 2,2'-azobis(2-methylpropionamidine) dihydrochloride (available as V-50 from Wako Pure Chemical Industries, Ltd.) dissolved in 50 g of deionized water was added. A dean stark trap was added to the setup to distill the solvent. The solvent was distilled from the reaction mixture until a temperature of the reaction mixture reached 90° C. The formed hybridized copolymer was found to contain 35% solids, had a viscosity 100 centipoises, and pH of 6.5.

A modified ASTM method D3359 was used to determine the adhesion of the residue on a substrate. A sample of the formed hybridized copolymer was dispersed in water in a 1:9 ratio. The dispersion was applied to a vinyl substrate by a No. 3 Meyer drawdown bar. After drying of the residue, an adhesive tape was applied over the residue. Upon removal of the tape from the substrate, it was found that all of the residue remained on the substrate, and no residue was found on the tape, which indicated excellent adhesion.

Another sample of the formed hybridized copolymer was dispersed in water in a 1:9 ratio. The dispersion was applied to a vinyl substrate by a No. 3 Meyer drawdown bar. After drying of the residue, the sample was analyzed via differential scanning calorimetry (DSC) and thermogravimetric analysis. In the DSC analysis, the reversible heat flow shows that the glass transition temperature ($T_g$) is at 50.25° C., which is essentially the same as that calculated $T_g$ of 50° C. A large peak around 190° C. indicates a combination of a melting process and an irreversible degradation of the polymer. Above 190° C., the polymer color turns from clear amber to an opaque black with a yellow-orange undertone.

Example 5

A mixture of 2000 g of methyl ethyl ketone, 350 g of poly(vinyl chloride-co-vinyl acetate-co-vinyl alcohol) terpolymer (available as UMOH from Wuxi Honghui Chemical Co., Ltd.), 50 g of 3-isopropenyl-α,α-dimethylbenzyl isocyanate (available from Cytec Industries), and 500 mg of dibutyltin dilaurate (available as DABCO® T-12 from Air Products and Chemicals, Inc.) was charged to a 12 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 40.0 g 2,2'-azodi(isobutyronitrile) (available as Perkadox® AMBN-gr from Akzo Nobel Polymer Chemicals LLC) in 500 g of methyl ethyl ketone. 30% of the initiator component was added to the reaction flask over a period of 15 minutes.

After 10 minutes of hold time, a monomer mixture, consisting of 50 g of t-butylaminoethyl methacrylate, 250 g of isobornyl methacrylate (available from Evonik Degussa Corp.), and 250 g of 2-dimethylaminoethyl methacrylate, was added simultaneously with the balance of the initiator component to the reaction flask over a period of 20 minutes. During the two hour hold the reaction mixture gelled.

Example 6

A mixture of 600 g of methyl ethyl ketone, 105 g of poly(vinyl chloride-co-vinyl acetate-co-vinyl alcohol) terpolymer (available as UMOH from Wuxi Honghui Chemical Co., Ltd.), 9.0 g of 3-isopropenyl-α,α-dimethylbenzyl isocyanate (available from Cytec Industries), and 150 mg of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 12 g of 2,2'-azodi(isobutyronitrile) (available as Perkadox® AMBN-gr from Akzo Nobel Polymer Chemicals LLC) in 150 g of methyl ethyl ketone. A first monomer mixture, consisting of 6 g of 3-isopropenyl-α,α-dimethylbenzyl isocyanate and 45 g of dimethylaminoethyl methacrylate (available from BASF), was added simultaneously with 30% of the initiator component to the reaction flask over a period of 15 minutes.

After 10 minutes of hold time, a second monomer mixture, consisting of 15.0 g of hydroxyethylacrylate, 75 g of Norsocryl 102 (75% methyl methacrylate and 25% 2-ethyl (2-oxoimidazolidin-1-yl) methacrylate, available from Arkema Inc.), 15 g of methylmethacrylate, and 45 g of 2-dimethylaminoethyl methacrylate, was added simultaneously with the balance of the initiator component to the reaction flask over a period of 20 minutes.

After one hour of hold time, 0.5 g of Silmer OH-Di-25 (a dihydroxy linear silicone polymer of about 25-SiMe$_2$O— units, available from Siltech LLC) was added to the reaction mixture.

After another hour of hold time, the reaction mixture was sampled, and the conversion was found to be low. 0.5 g of 2,2'-azobis(2-methylbutyronitrile), and 250 mg of benzoyl peroxide was added. This was repeated 5 minutes later, and the reaction was left to stir for an additional hour. A dean stark trap attached to the reaction flask setup, and about 100 g of the solvent was distilled from the reaction mixture.

200 g of isopropanol was added to the reaction mixture, followed by an addition of a solution of 24 g acetic acid and 3 g lactic acid in 100 g of deionized water over 10 minutes. The temperature was raised and distillation was continued until the temperature reached 90° C. Finally, 1.5 g of 2,2'-azobis(2-methylpropionamidine) dihydrochloride (available as V-50 from Wako Chemicals USA, Inc.), and all of the solvent was stripped off to yield an opalescent liquid.

Example 7

A mixture of 100 g of methyl ethyl ketone, 100 g of Eastman™ Adhesion Promoter AP 550-1 (a non-chlorinated adhesion promoter available from Eastman Chemical Company), 3 g of 3-isopropenyl-α,α-dimethylbenzyl isocyanate (available from Cytec Industries), and 30 mg of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to achieve a homogeneity.

In a separate flask, an initiator component was prepared by dissolving 3 g of 2,2'-azodi(isobutyronitrile) (available as Perkadox® AMBN-gr from Akzo Nobel Polymer Chemicals LLC) in 40 g of methyl ethyl ketone. A first monomer mixture, consisting of 2 g of 3-isopropenyl-α,α-dimethylbenzyl isocyanate and 11 g of dimethylaminoethyl methacrylate (available from BASF), was added simultaneously with 30% of the initiator component to the reaction flask over a period of 15 minutes.

After 10 minutes of hold time, a second monomer mixture, consisting of 3.7 g of hydroxyethylacrylate, 18.7 g of Norsocryl 102 (75% methyl methacrylate and 25% 2-ethyl (2-oxoimidazolidin-1-yl) methacrylate, available from Arkema Inc.), 4 g of methylmethacrylate, and 11 g of 2-dimethylaminoethyl methacrylate, was added simultaneously with the balance of the initiator component to the reaction flask over a period of 20 minutes.

After one hour of hold time, 0.1 g of Silmer OH-Di-25 (available from Siltech Corporation) was added to the reaction mixture.

After another hour of hold time, the reaction mixture was sampled, and the conversion was found to be low. 0.5 g of 2,2'-azodi(isobutyronitrile) (available as Perkadox® AMBN-gr from Akzo Nobel Polymer Chemicals LLC) and 250 mg of benzoyl peroxide were added. Five minutes later, another 0.5 g of 2,2'-azodi(isobutyronitrile) and 250 mg of benzoyl peroxide were added. A dean stark trap attached to the reaction flask setup, and about 100 g of the solvent was distilled from the reaction mixture.

50 g of isopropanol was added to the reaction mixture and the mixture was held at the elevated temperature until conversion was completed as determined by the above described solids test. After cooling the reaction mixture to 65° C., a solution of 6.0 g of acetic acid and 1.0 g of lactic acid in 25 g of deionized water was added over 10 minutes. Finally, 0.37 g of 2,2'-azobis(2-methylpropionamidine) dihydrochloride (available as V-50 from Wako Chemicals USA, Inc.) in 325 g of water, and all of the solvent was stripped off by using a dean stark trap until 90° C. is reached, to yield an opalescent liquid. The formed polymer was found to contain 35% solids, had a viscosity 100 centipoises, and pH of 6.5.

Example 8

A mixture of 300 g of methyl ethyl ketone, 100 g of Eastman™ Adhesion Promoter AP 550-1 (a non-chlorinated adhesion promoter available from Eastman Chemical Company), 9 g of 3-isopropenyl-α,α-dimethylbenzyl isocyanate (available from Cytec Industries), and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to 80° C. to achieve a homogeneity.

In a separate flask, an initiator component was prepared by dissolving 9 g of 2,2'-azodi(isobutyronitrile) (available as Perkadox® AMBN-gr from Akzo Nobel Polymer Chemicals LLC) in 120 g of methyl ethyl ketone. A first monomer mixture, consisting of 6 g of 3-isopropenyl-α,α-dimethylbenzyl isocyanate and 33 g of dimethylaminoethyl methacrylate (available from BASF), was added simultaneously with 30% of the initiator component to the reaction flask over a period of 15 minutes.

After 10 minutes of hold time, 2.0 g of Silmer OH-Di-25 (available from Siltech Corporation) was added to the reaction mixture.

After additional 5 minutes, a second monomer mixture, consisting of 11.1 g of hydroxyethylacrylate, 56.25 g of Norsocryl 102 (75% methyl methacrylate and 25% 2-ethyl (2-oxoimidazolidin-1-yl) methacrylate, available from Arkema Inc.), 12 g of methylmethacrylate, and 33 g of 2-dimethylaminoethyl methacrylate, was added simultaneously with the balance of the initiator component to the reaction flask over a period of 20 minutes.

After another hour of hold time, 0.5 g of 2,2'-azodi (isobutyronitrile) (available as Perkadox® AMBN-gr from Akzo Nobel Polymer Chemicals LLC) and 250 mg of benzoyl peroxide was added. The reaction mixture was sampled, and the conversion was found to be low. 0.5 g of 2,2'-azodi(isobutyronitrile) and 250 mg of benzoyl peroxide was added. Five minutes later, still another 0.5 g of 2,2'-azodi(isobutyronitrile) and 250 mg of benzoyl peroxide was added. A dean stark trap attached to the reaction flask setup, and about 100 g of the solvent was distilled from the reaction mixture.

After 150 g of isopropanol was added to the reaction mixture, and the mixture was stirred for 10 minutes, followed by an addition of a neutralization solution, consisting of 18 g of acetic acid and 3 g of lactic acid in 75 g of deionized water.

Finally, 0.9 g of 2,2'-azobis(2-methylpropionamidine) dihydrochloride (available as V-50 from Wako Chemicals USA, Inc.) in 400 g of water was added, and all of the solvent was stripped off by using a dean stark trap until 90° C. is reached, to yield an opalescent liquid. The formed polymer was found to contain 35% solids, had a viscosity 100 centipoises, and pH of 5.9.

Example 9

A mixture of 400 g of methyl ethyl ketone, 70 g of poly(vinyl chloride-co-vinyl acetate-co-vinyl alcohol) terpolymer (available as UMOH from Wuxi Honghui Chemical Co., Ltd.), 6 g of 3-isopropenyl-α,α-dimethylbenzyl isocyanate (available from Cytec Industries), and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to 80° C. to achieve a homogeneity and dissolution of the UMOH.

In a separate flask, an initiator component was prepared by dissolving 8 g of 2,2'-azodi(isobutyronitrile) (available as Perkadox® AMBN-gr from Akzo Nobel Polymer Chemicals LLC) in 100 g of methyl ethyl ketone. A first monomer mixture, consisting of 4 g of 3-isopropenyl-α,α-dimethylbenzyl isocyanate and 30 g of dimethylaminoethyl methacrylate (available from BASF), was added simultaneously with 30% of the initiator component to the reaction flask over a period of 15 minutes.

After 10 minutes of hold time, 1.0 g of Silmer OH-Di-25 (available from Siltech Corporation) was added to the reaction mixture.

After additional 5 minutes, a second monomer mixture, consisting of 10.0 g of hydroxyethylacrylate, 50.0 g of Norsocryl 102 (75% methyl methacrylate and 25% 2-ethyl (2-oxoimidazolidin-1-yl) methacrylate, available from Arkema Inc.), 10.0 g of methylmethacrylate, and 30.0 g of 2-dimethylaminoethyl methacrylate, was added simultaneously with the balance of the initiator component to the reaction flask over a period of 20 minutes.

After another hour of hold time, 0.5 g of 2,2'-azodi (isobutyronitrile) (available as Perkadox® AMBN-gr from Akzo Nobel Polymer Chemicals LLC) and 250 mg of benzoyl peroxide was added. The reaction mixture was sampled, and the conversion was found to be low. 0.5 g of 2,2'-azodi(isobutyronitrile) and 250 mg of benzoyl peroxide was added. Five minutes later, yet another 0.5 g of 2,2'-azodi(isobutyronitrile) and 250 mg of benzoyl peroxide was added. A dean stark trap attached to the reaction flask setup, and about 100 g of the solvent was distilled from the reaction mixture.

The reaction mixture was held for until the completion of the polymerization, after which the mixture was cooled to 65° C. A neutralization solution of 16.0 g acetic acid and 2.0 g lactic acid in 400 g of deionized water was added to the reaction mixture over 10 minutes. 120 g of isopropyl alcohol was added, followed by an addition of 0.5 g of 2,2'-azobis (2-methylpropionamidine)dihydrochloride (available as V-50 from Wako Chemicals USA, Inc.) in 100 g of deionized water. A dean stark trap was added to the setup to distill the solvent. The reaction mixture was stripped until a temperature of 90° C. was obtained, to yield an opalescent liquid. The final product's physical properties measured: solids 33%, viscosity 300 centipoises, and pH: 5.9.

Example 10

A mixture of 400 g of methyl ethyl ketone, 70.0 g of poly(vinyl chloride-co-vinyl acetate-co-vinyl alcohol) terpolymer (available as UMOH from Wuxi Honghui Chemical Co., Ltd.), and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 75° C. to 80° C. to achieve a homogeneity and dissolution of the UMOH, after which 6 g of 3-isopropenyl-α,α-dimethylbenzyl isocyanate (available from Cytec Industries) was added.

In a separate flask, an initiator component was prepared by dissolving 8 g of 2,2'-azodi(isobutyronitrile) (available as Perkadox® AMBN-gr from Akzo Nobel Polymer Chemicals LLC) in 100 g of methyl ethyl ketone. A first monomer component, consisting of 4 g of 3-isopropenyl-α,α-dimethylbenzyl isocyanate and 15 g of dimethylaminoethyl methacrylate (available from BASF), was added simultaneously with 30% of the initiator component to the reaction flask over a period of 15 minutes.

After 5 minutes of hold time, 1.0 g of Silmer OH-Di-25 (available from Siltech Corporation) was added to the reaction mixture.

After additional 5 minutes, a second monomer component, consisting of 10.0 g of hydroxyethylacrylate, 20.0 g of Norsocryl 102 (75% methyl methacrylate and 25% 2-ethyl (2-oxoimidazolidin-1-yl) methacrylate, available from Arkema Inc.), 70.0 g of methylmethacrylate, 18.0 g of 2-dimethylaminoethyl methacrylate, and 10.0 g of Ruva 93 was added simultaneously with the balance of the initiator component to the reaction flask over a period of 20 minutes.

After another hour of hold time, 0.5 g of 2,2'-azodi (isobutyronitrile) (available as Perkadox® AMBN-gr from Akzo Nobel Polymer Chemicals LLC) and 250 mg of benzoyl peroxide was added. The reaction mixture was sampled, and the conversion was found to be low. 0.5 g of 2,2'-azodi(isobutyronitrile) and 250 mg of benzoyl peroxide was added. Five minutes later, yet another 0.5 g of 2,2'-azodi(isobutyronitrile) and 250 mg of benzoyl peroxide was added. A dean stark trap attached to the reaction flask setup, and about 100 g of the solvent was distilled from the reaction mixture.

The reaction mixture was held for until the completion of the polymerization, after which the mixture was cooled to 65° C. A neutralization solution of 8.0 g acetic acid and 2.0 g lactic acid in 400 g of deionized water was added to the reaction mixture over 10 minutes. 120 g of isopropyl alcohol was added, followed by an addition of 0.5 g of 2,2'-azobis (2-methylpropionamidine)dihydrochloride (available as V-50 from Wako Chemicals USA, Inc.) in 100 g of dionized water. A dean stark trap was added to the setup to distill the solvent. The reactions mixture was stripped until a temperature of 90° C. was obtained, to yield an opalescent liquid. The final product's physical properties measured: solids 35%, and pH: 5.9.

Example 11

A mixture of 400 g of methyl ethyl ketone, 70.0 g of poly(vinyl chloride-co-vinyl acetate-co-vinyl alcohol) terpolymer (available as UMOH from Wuxi Honghui Chemical Co., Ltd.), and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 80° C. to achieve a homogeneity and dissolution of the UMOH, after which 6 g of 3-isopropenyl-α,α-dimethylbenzyl isocyanate (available from Cytec Industries) was added.

In a separate flask, an initiator component was prepared by dissolving 7 g of 2,2'-azodi(isobutyronitrile) (available as Perkadox® AMBN-gr from Akzo Nobel Polymer Chemicals LLC) and 2.0 g of benzoyl peroxide in 100 g of methyl ethyl ketone. A first monomer component, consisting of 6 g of 3-isopropenyl-α,α-dimethylbenzyl isocyanate and 20 g of dimethylaminoethyl methacrylate (available from BASF), was added simultaneously with 30% of the initiator component to the reaction flask over a period of 15 minutes.

After 10 minutes of hold time, 4.0 g of Silmer OH-Di-25 (available from Siltech Corporation) was added to the reaction mixture.

After additional 5 minutes, a second monomer component, consisting of 9.0 g of hydroxyethylacrylate, 20.0 g of Norsocryl 102 (75% methyl methacrylate and 25% 2-ethyl (2-oxoimidazolidin-1-yl) methacrylate, available from Arkema Inc.), 46.0 g of methylmethacrylate, 30.0 g of isobornyl methacrylate, 25.0 g of 2-dimethylaminoethyl methacrylate, and 1.0 g of Ruva 93 was added simultaneously with the balance of the initiator component to the reaction flask over a period of 20 minutes.

After another hour of hold time, 0.5 g of 2,2'-azodi (isobutyronitrile) and 250 mg of benzoyl peroxide was added. An additional hour later, another 0.5 g of 2,2'-azodi (isobutyronitrile) and 250 mg of benzoyl peroxide was added. A dean stark trap attached to the reaction flask setup, and about 100 g of the solvent was distilled from the reaction mixture.

The reaction mixture was held for until the completion of the polymerization, after which the mixture was cooled to 65° C. A mixture of 0.70 g of pentaerythritol tetrakis(3-(3, 5-di-tert-butyl-4-hydroxyphenyl)propionate) (available as Irganox® 1010 from Ciba Specialty Chemicals) and 2.8 g dilaurylthioldipropionate in 20 g methyl ethyl ketone, was added followed by 60 g isopropyl alcohol.

After 10 minutes, a neutralization solution of 6.0 g acetic acid in 100 g of deionized water was added to the reaction mixture, followed by an addition of neutralization solution of 6.0 g acetic acid in 100 g of deionized water. Finally, 0.1 g of 2,2'-azobis(2-methylpropionamidine)dihydrochloride (available as V-50 from Wako Chemicals USA, Inc.) in 100 g of dionized water was added to the reaction mixture. A dean stark trap was added to the setup to distill the solvent. The reactions mixture was stripped until a temperature of 90° C. was obtained, to yield a milky white to opalescent liquid. The final product's physical properties measured: solids 33%, No. 3 Zahn cup 8", and pH: 5.8.

Example 12

A mixture of 300 g of methyl ethyl ketone, 100.0 g of AP-550, and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser. The resulting mixture in the reaction flask was stirred under nitrogen and warmed to 80° C. to achieve a homogeneity and dissolution of the UMOH, after which 6.0 g of 3-isopropenyl-α,α-dimethylbenzyl isocyanate (available from Cytec Industries) was added.

In a separate flask, an initiator component was prepared by dissolving 7 g of 2,2'-azodi(isobutyronitrile) (available as Perkadox® AMBN-gr from Akzo Nobel Polymer Chemicals LLC) and 1.0 g of benzoyl peroxide in 100 g of methyl ethyl ketone. A first monomer component, consisting of 4.0 g of 3-isopropenyl-α,α-dimethylbenzyl isocyanate and 20.0 g of dimethylaminoethyl methacrylate (available from BASF), was added simultaneously with 30% of the initiator component to the reaction flask over a period of 15 minutes.

After 10 minutes of hold time, 4.0 g of Silmer OH-Di-25 (available from Siltech Corporation) was added to the reaction mixture.

After additional 5 minutes, a second monomer component, consisting of 9.0 g of hydroxyethylacrylate, 20.0 g of Norsocryl 102 (75% methyl methacrylate and 25% 2-ethyl (2-oxoimidazolidin-1-yl) methacrylate, available from Arkema Inc.), 46.0 g of methylmethacrylate, 30.0 g of isobornyl methacrylate, 25.0 g of 2-dimethylaminoethyl methacrylate, and 1.0 g of Ruva 93 was added simultaneously with the balance of the initiator component to the reaction flask over a period of 20 minutes.

After another hour of hold time, 0.5 g of 2,2'-azodi (isobutyronitrile) and 250 mg of benzoyl peroxide was added. An additional hour later, another 0.5 g of 2,2'-azodi (isobutyronitrile) and 250 mg of benzoyl peroxide was added. A dean stark trap attached to the reaction flask setup, and about 100 g of the solvent was distilled from the reaction mixture.

The reaction mixture was held for until the completion of the polymerization, after which the mixture was cooled to 65° C. A mixture of 0.70 g of pentaerythritol tetrakis(3-(3, 5-di-tert-butyl-4-hydroxyphenyl)propionate) (available as Irganox® 1010 from Ciba Specialty Chemicals) and 2.8 g dilaurylthioldipropionate in 20 g methyl ethyl ketone, was added followed by 60 g isopropyl alcohol.

After 10 minutes, a neutralization solution of 6.0 g acetic acid in 100 g of deionized water was added to the reaction mixture, followed by an addition of neutralization solution of 6.0 g lactic acid in 100 g of deionized water. Finally, 0.1 g of 2,2'-azobis(2-methylpropionamidine)dihydrochloride (available as V-50 from Wako Chemicals USA, Inc.) in 350 g of dionized water was added to the reaction mixture. A dean stark trap was added to the setup to distill the solvent. The reactions mixture was stripped until a temperature of 90° C. was obtained, to yield a translucent liquid. The final product's physical properties measured: solids 34%, and pH: 5.8.

Example 13

A mixture of 400 g of methyl ethyl ketone, 20.0 g of toluene, 60.0 g of poly(vinyl chloride-co-vinyl acetate-covinyl alcohol) terpolymer (available as UMOH from Wuxi Honghui Chemical Co., Ltd.), 6.0 g of 3-isopropenyl-α,α-dimethylbenzyl isocyanate, 10.0 g of AP-550, and 0.1 g of dibutyltin dilaurate (available as DABCO® T-12 from Air Products and Chemicals, Inc.) was charged to a 3 liter 4-neck round bottom flask equipped with a grade 316 stainless steel stirrer, thermocouple, and temperature controller, heating mantle, two metering addition funnels, nitrogen supply line, and reflux condenser.

The resulting mixture in the reaction flask was stirred under nitrogen and warmed to 80° C. to achieve a homogeneity and dissolution of the UMOH and AP-550.

In a separate flask, an initiator component was prepared by dissolving 7.0 g of 2,2'-azodi(isobutyronitrile) (available as Perkadox® AMBN-gr from Akzo Nobel Polymer Chemicals LLC) and 2.0 g of benzoyl peroxide in 100 g of methyl ethyl ketone.

A first monomer component, consisting of 4.0 g of 3-isopropenyl-α,α-dimethylbenzyl isocyanate and 30.0 g of dimethylaminoethyl methacrylate (available from BASF), was added simultaneously with 30% of the initiator component to the reaction mixture over a period of 15 minutes.

After 5 minutes of hold time, 2.0 g of Silmer OH-Di-25 (available from Siltech Corporation) was added to the reaction mixture.

After additional 5 minutes, a second monomer component, consisting of 9.0 g of hydroxyethylacrylate, 70.0 g of methylmethacrylate, 30.0 g of 2-dimethylaminoethyl methacrylate, 30.0 g of Norsocryl 102 (75% methyl methacrylate and 25% 2-ethyl (2-oxoimidazolidin-1-yl) methacrylate, available from Arkema Inc.), and 1.0 g of Ruva 93 was added simultaneously with the balance of the initiator component to the reaction flask over a period of 20 minutes.

After another hour of hold time, 0.5 g of 2,2'-azodi(isobutyronitrile) and 250 mg of benzoyl peroxide was added. An additional hour later, another 0.5 g of 2,2'-azodi(isobutyronitrile) and 250 mg of benzoyl peroxide was added. A dean stark trap attached to the reaction flask setup, and about 100 g of the solvent was distilled from the reaction mixture.

The reaction mixture was held for until the completion of the polymerization, after which the mixture was cooled to 65° C. A mixture of 0.70 g of pentaerythritol tetrakis(3-(3,5-di-tert-butyl-4-hydroxyphenyl)propionate) (available as Irganox® 1010 from Ciba Specialty Chemicals) and 2.8 g dilaurylthioldipropionate in 20 g methyl ethyl ketone, was added followed by 60 g isopropyl alcohol.

After 10 minutes, a neutralization solution of 6.0 g acetic acid in 100 g of deionized water was added to the reaction mixture, followed by an addition of neutralization solution of 6.0 g acetic acid in 100 g of deionized water. Finally, 0.1 g of 2,2'-azobis(2-methylpropionamidine)dihydrochloride (available as V-50 from Wako Chemicals USA, Inc.) in 350 g of dionized water was added to the reaction mixture. A dean stark trap was added to the setup to distill the solvent. The reactions mixture was stripped until a temperature of 90° C. was obtained, to yield an opalescent liquid. The final product's physical properties measured: solids 33%, and pH: 5.7.

What is claimed is:

1. A process for preparing a hybridized copolymer comprising the steps of
   (a) reacting a functionalized hydrophobic polymer of an average molecular weight ($M_n$) of from about 15,000 to about 200,000, with a hybridizing compound to create a reaction mixture;
   (b) adding a first monomer component to the reaction mixture;
   (c) adding a second monomer component to the reaction mixture; and
   (d) neutralizing the reaction mixture with an acid,
   wherein the hydrophobic polymer is selected from the group consisting of a polysiloxane polymer, a polyolefin polymer, a polyvinyl polymer, and a combination thereof,
   wherein the first monomer component, or the second monomer component, or both monomer components comprise a polymerizable unsaturated monomer, and
   wherein the first monomer component, or the second monomer component, or both monomer components comprise a polymerizable amine-containing unsaturated monomer.

2. The process of claim 1, wherein the hydrophobic polymer comprises a polyvinyl copolymer.

3. The process of claim 2, wherein the polyvinyl copolymer is a reaction product of vinyl chloride, vinyl acetate, and a functionalized vinyl monomer.

4. The process of claim 2, wherein the functionalized hydrophobic polymer comprises 5 to 60 weight percent of a functionalized polyvinyl polymer.

5. The process of claim 1, wherein the first monomer component comprises the polymerizable amine-containing unsaturated monomer which is selected from the group consisting of an amine-containing acrylate monomer, an amine-containing methacrylate monomer, an acrylamide monomer, and a methacrylamide monomer.

6. The process of claim 5, wherein the ratio of moles of polymerizable amine-containing unsaturated monomer to mole of the functionality of the functionalized hydrophobic polymer is 3:1 and 12:1.

7. The process of claim 1, wherein the molar ratio of the polymerizable unsaturated monomer to the polymerizable amine-containing unsaturated monomer is from 1:3 to 4:1.

8. The process of claim 1, wherein the second monomer component comprises the polymerizable unsaturated monomer, wherein the polymerizable unsaturated monomer is selected from the group consisting of an acrylate monomer, a methacrylate monomer, an aromatic vinyl monomer, a vinyl ester monomer, a vinyl cyanogen-containing monomer, a halogenoid monomer, an olefin monomer, and a diene monomer.

9. The process of claim 1, wherein either the first monomer component, or the second monomer component, or both monomer components further comprise a chain transfer agent.

10. The process of claim 1, wherein the hybridizing compound comprises an alkene functional group, and a functional group selected from the group consisting of an isocyanate, amino, and epoxy.

11. The process of claim 10, wherein the hybridizing compound comprises an isopropenyl functional group, and an isocyanate functional group.

12. The process of claim 11, wherein the hybridizing compound is 3-isopropenyl-alpha,alpha-dimethylbenzyl isocyanate.

13. The process of claim 1, wherein the acid is a weak acid.

14. The process of claim 13, wherein the weak acid is selected from the group consisting of acetic acid, lactic acid, formic acid, propionic acid, and carbonic acid.

15. The process of claim 1, wherein an initiator component is added to the reaction mixture simultaneous with either the first monomer component, or the second monomer component, or both.

16. The process of claim 15, wherein the initiator component comprises a free radical polymerization initiator.

17. The process of claim 16, wherein the free radical polymerization initiator is selected from the group consisting of benzoyl peroxide and 2,2'-azodi(isobutyronitrile).

18. A process for preparing a hybridized copolymer comprising the steps of
(a) reacting a functionalized hydrophobic polymer of an average molecular weight ($M_n$) of from about 15,000 to about 200,000, with a hybridizing compound to create a reaction mixture;
(b) adding a monomer component to the reaction mixture; and
(c) neutralizing the reaction mixture with an acid,
wherein the hydrophobic polymer is selected from the group consisting of a polysiloxane polymer, a polyolefin polymer, and a polyvinyl polymer or a combination thereof, and
wherein the monomer component comprises a polymerizable unsaturated monomer and a polymerizable amine-containing unsaturated monomer.

19. The process of claim 18, wherein the hydrophobic polymer comprises a polyvinyl copolymer.

20. The process of claim 19, wherein the polyvinyl copolymer is a reaction product of vinyl chloride, vinyl acetate, and a functionalized vinyl monomer.

21. The process of claim 18, wherein the functionalized hydrophobic polymer comprises 10 to 60 weight percent of a functionalized polyvinyl polymer.

22. The process of claim 18, wherein the polymerizable unsaturated monomer is selected from the group consisting of an acrylate monomer, a methacrylate monomer, an aromatic vinyl monomer, a vinyl ester monomer, a vinyl cyanogen-containing monomer, a halogenoid monomer, an olefin monomer, and a diene monomer.

23. The process of claim 18, wherein the polymerizable amine-containing unsaturated monomer is selected from the group consisting of an amine-containing acrylate, an amine-containing methacrylate monomer, an acrylamide, and a methacrylamide.

24. The process of claim 18, wherein the hybridizing compound comprises a vinyl moiety, and a moiety selected from the group consisting of an isocyanate, amino, and epoxy.

25. The process of claim 24, wherein the hybridizing compound comprises a vinyl moiety, and an isocyanate moiety.

26. The process of claim 25, wherein the hybridizing compound is 3-isopropenyl-alpha,alpha-dimethylbenzyl isocyanate.

27. The process of claim 18, wherein the acid is a weak acid.

28. The process of claim 27, wherein the weak acid is selected from the group consisting of acetic acid, lactic acid, formic acid, propionic acid, and carbonic acid.

29. The process of claim 18, wherein the monomer component further comprises a free radical polymerization initiator.

30. The process of claim 29, wherein the free radical polymerization initiator is selected from the group consisting of benzoyl peroxide and 2,2'-azodi(isobutyronitrile).

31. A process for preparing a hybridized copolymer comprising the steps of
(a) mixing a functionalized hydrophobic polymer of an average molecular weight ($M_n$) of from about 15,000 to about 200,000, a hybridizing compound, a polymerizable unsaturated monomer, and a polymerizable amine-containing unsaturated monomer to create a reaction mixture;
(b) increasing the temperature of the reaction mixture to cause a polymerization reaction to occur within the reaction mixture; and
(c) neutralizing the reaction mixture with an acid,
wherein the hydrophobic polymer is selected from the group consisting of a polysiloxane polymer, a polyolefin polymer, and a polyvinyl polymer, or a combination thereof.

32. The process of claim 31, wherein the hydrophobic polymer comprises a polyvinyl copolymer.

33. The process of claim 32, wherein the polyvinyl copolymer is a reaction product of vinyl chloride, vinyl acetate, and a functionalized vinyl monomer.

34. The process of claim 32, wherein the functionalized hydrophobic polymer comprises 10 to 60 weight percent of a functionalized polyvinyl polymer.

35. The process of claim 31, wherein polymerizable unsaturated monomer is selected from the group consisting of an acrylate monomer, a methacrylate monomer, an aromatic vinyl monomer, a vinyl ester monomer, a vinyl cyanogen-containing monomer, a halogenoid monomer, an olefin monomer, and a diene monomer.

36. The process of claim 31, wherein polymerizable amine-containing unsaturated monomer is selected from the group consisting of an amine-containing acrylate monomer, an amine-containing methacrylate monomer, an acrylamide monomer, and a methacrylamide monomer.

37. The process of claim 31, wherein the hybridizing compound comprises a vinyl moiety, and a moiety selected from the group consisting of an isocyanate, amino, and epoxy.

38. The process of claim 37, wherein the hybridizing compound comprises a vinyl moiety, and an isocyanate moiety.

39. The process of claim 38, wherein the hybridizing compound is 3-isopropenyl-alpha,alpha-dimethylbenzyl isocyanate.

40. The process of claim 31, wherein the acid is a weak acid.

41. The process of claim 40, wherein the weak acid is selected from the group consisting of acetic acid, lactic acid, formic acid, propionic acid, and carbonic acid.

42. The process of claim 31, wherein the reaction mixture further comprises a free radical polymerization initiator.

43. The process of claim 42, wherein the initiator is selected from the group consisting of benzoyl peroxide and 2,2'-azodi(isobutyronitrile).

* * * * *